United States Patent
Huang et al.

(10) Patent No.: US 9,532,212 B2
(45) Date of Patent: Dec. 27, 2016

(54) METHOD AND APPARATUS FOR PROCESSING DATA AND MESSAGE

(71) Applicant: Huawei Device Co., Ltd., Shenzhen (CN)

(72) Inventors: Jiejing Huang, Shenzhen (CN); Huangwei Wu, Shenzhen (CN); Xi Huang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 91 days.

(21) Appl. No.: 14/331,616

(22) Filed: Jul. 15, 2014

(65) Prior Publication Data

US 2014/0378099 A1    Dec. 25, 2014

Related U.S. Application Data

(63) Continuation of application No. PCT/CN2013/077502, filed on Jun. 19, 2013.

(51) Int. Cl.
*H04M 1/66* (2006.01)
*H04M 1/68* (2006.01)
(Continued)

(52) U.S. Cl.
CPC ............... *H04W 12/02* (2013.01); *H04M 1/67* (2013.01); *H04M 1/72563* (2013.01)

(58) Field of Classification Search
CPC ..... H04M 1/67; H04M 1/72563; H04W 12/02
(Continued)

(56) References Cited

U.S. PATENT DOCUMENTS

| 9,100,694 | B1* | 8/2015 | Chandel ........... H04N 21/44218 |
| 2005/0007236 | A1* | 1/2005 | Lane .................... G06K 19/025 340/5.86 |

(Continued)

FOREIGN PATENT DOCUMENTS

| CN | 1889728 A | 1/2007 |
| CN | 101155050 A | 4/2008 |

(Continued)

OTHER PUBLICATIONS

Partial English Translation and Abstract of Chinese Patent Application No. CN101345963A, Aug. 27, 2014, 3 pages.

(Continued)

*Primary Examiner* — Joseph Arevalo
(74) *Attorney, Agent, or Firm* — Conley Rose, P.C.

(57) ABSTRACT

A method for processing data and a message are provided. The method includes: receiving, by a terminal, first switch information, entering a first working mode, and classifying data stored on the terminal; in a first screen lock state or the first working mode, when a notification message related to the data is received, displaying the notification message related to the data; receiving second switch information, entering a second working mode, and hiding, according to classification of the data, data of a specified category; in a second screen lock state or the second working mode, when a notification message related to the data of the specified category is received, hiding the notification message; and receiving the first switch information, entering the first working mode, and displaying the data of the specified category and the notification message that are hidden.

18 Claims, 18 Drawing Sheets

(51) Int. Cl.
*H04M 3/16* (2006.01)
*H04W 12/02* (2009.01)
*H04M 1/725* (2006.01)
*H04M 1/67* (2006.01)

(58) Field of Classification Search
USPC ..................................... 455/411, 562.1, 558
See application file for complete search history.

(56) References Cited

U.S. PATENT DOCUMENTS

| | | | | |
|---|---|---|---|---|
| 2009/0119754 | A1* | 5/2009 | Schubert | H04L 63/0853 726/4 |
| 2009/0240767 | A1 | 9/2009 | Zhang | |
| 2012/0154413 | A1* | 6/2012 | Kim | H04M 1/72563 345/530 |
| 2012/0157165 | A1 | 6/2012 | Kim et al. | |
| 2012/0159139 | A1* | 6/2012 | Kim | H04M 1/72563 713/2 |
| 2014/0071813 | A1* | 3/2014 | Cheung | H04L 49/65 370/228 |

FOREIGN PATENT DOCUMENTS

| | | |
|---|---|---|
| CN | 101345963 A | 1/2009 |
| CN | 102457619 A | 5/2012 |
| CN | 102572093 A | 7/2012 |
| CN | 102710847 A | 10/2012 |
| EP | 2469814 A1 | 6/2012 |

OTHER PUBLICATIONS

Partial English Translation and Abstract of Chinese Patent Application No. CN102457619A, Aug. 27, 2014, 3 pages.
Partial English Translation and Abstract of Chinese Patent Application No. CN102710847, Oct. 13, 2014, 8 pages.
Foreign Communication From a Counterpart Application, PCT Application No. PCT/CN2013/077502, International Search Report dated Mar. 27, 2014, 6 pages.
Foreign Communication From a Counterpart Application, PCT Application No. PCT/CN2013/077502, Written Opinion dated Mar. 27, 2014, 4 pages.
Partial English Translation and Abstract of Chinese Patent Application No. CN1889728, Oct. 9, 2015, 12 pages.
Foreign Communication From a Counterpart Application, Chinese Application No. 201380000911.8, Chinese Search Report dated Aug. 20, 2015, 2 pages.
Foreign Communication From a Counterpart Application, Chinese Application No. 201380000911.8, Chinese Office Action dated Aug. 28, 2015, 5 pages.
Foreign Communication From a Counterpart Application, European Application No. 13866491.7, Extended European Search Report dated Jul. 7, 2015, 8 pages.

* cited by examiner

METHOD AND APPARATUS FOR PROCESSING DATA AND MESSAGE

CROSS-REFERENCE TO RELATED APPLICATION

This application is a continuation of International Application No. PCT/CN2013/077502, filed on Jun. 19, 2013, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a method and an apparatus for processing data and a message.

BACKGROUND

With the rapid development of communications technologies and the mobile phone industry, a mobile terminal, such as a mobile phone or a communication tablet, plays a more important role in people's lives. Different requirements of people in various aspects such as social interaction, shopping, entertainment, work, and study can be met by using various software applications. However, a mobile terminal that is used by an individual usually stores a relatively large amount of data, information, or the like that relates to personal privacy and secrets, for example, a short message service (SMS) message, a call record, a message of instant messaging software, and bank transaction information. Using a mobile phone as an example, when a user does not have the mobile phone at hand because the user goes out for sports and it is inconvenient for the user to carry the mobile phone, or because the user needs to temporarily lend the mobile phone to another person, it is highly possible that some data relating to personal privacy of the user, for example, data that is stored on the mobile phone by the user and a personal notification message that is newly received, may be disclosed.

In a first prior art, a mobile phone is locked in a manner of setting a password, and another user cannot view data on the mobile phone. This can protect privacy of a user. However, in a scenario that another user needs to use the mobile phone, for example, borrow the mobile phone to make a call, search for a phone number of a colleague, or play a mobile phone game, this manner of full locking completely prevents the another user from using the mobile phone. In a second prior art, user privacy is protected in a manner of fully disabling some applications on a mobile phone, for example, disabling an SMS message function. This also restricts another user from using a function of the mobile phone, which is not helpful for making full use of the mobile phone.

SUMMARY

Embodiments of the present invention provide a method and an apparatus for processing data and a message, which are capable of hiding personal data of a user and a related notification message, thereby protecting personal privacy of the user without affecting use of a terminal by multiple users.

A first aspect of the embodiments of the present invention provides a method for processing data and a message, where the method may include: receiving, by a terminal, first switch information, entering a first working mode, and classifying data stored on the terminal; in a first screen lock state or the first working mode, when a notification message related to the data is received, displaying the notification message related to the data; receiving second switch information, entering a second working mode, and hiding, according to classification of the data, data of a specified category; in a second screen lock state or the second working mode, when a notification message related to the data of the specified category is received, hiding the notification message; and receiving the first switch information, entering the first working mode, and displaying the data of the specified category and the notification message that are hidden.

In a first possible implementation manner, the method further includes: in the second screen lock state or the second working mode, when content of the received notification message matches content of a preset shielding library, hiding the notification message, where the preset shielding library is a set of shielded content that is set in advance.

With reference to the first possible implementation manner of the first aspect, in a second possible implementation manner, the content of the notification message includes at least one of the following: information about a sender of the notification message, and text content, image content, or video content of the notification message.

With reference to the first aspect or with reference to the first or the second possible implementation manner of the first aspect, in a third possible implementation manner, the receiving, by a terminal, first switch information, entering a first working mode, and classifying data stored on the terminal includes: receiving, by the terminal, the first switch information, and entering the first working mode; in the first working mode, receiving classification instruction information; and classifying the data into at least two categories according to the classification instruction information.

With reference to the first aspect or with reference to the first, the second, or the third possible implementation manner of the first aspect, in a fourth possible implementation manner, the first screen lock state is a screen lock state that the terminal enters when an instruction for exiting the first working mode or a first screen lock instruction is received, or when first preset screen lock time arrives; and the second screen lock state is a screen lock state that the terminal enters when an instruction for exiting the second working mode or a second screen lock instruction is received, or when second preset screen lock time arrives.

With reference to the first aspect or with reference to the first, the second, the third, or the fourth possible implementation manner of the first aspect, in a fifth possible implementation manner, the data stored on the terminal includes at least one of the following: contact information, a call record, an SMS message, an electronic mail (email), an image, a video, and a software application.

With reference to the fifth possible implementation manner of the first aspect, in a sixth possible implementation manner, the contact information includes at least a contact name and a phone number.

A second aspect of the embodiments of the present invention provides an apparatus for processing data and a message, where the apparatus may include: a classifying unit configured to receive first switch information, enter a first working mode, and classify data stored on the apparatus; a hiding unit configured to receive second switch information, enter a second working mode, and hide, according to classification of the data, data of a specified category and a notification message related to the data of the specified category; and in a second screen lock state or the second working mode, when the notification message related to the data of the specified category is received, hide the notification message; and a displaying unit configured to: in a first screen lock state or the first working mode, when a notification message related to the data is received, display the notification message related to the data; and receive the first switch information, enter the first working mode, and display the data of the specified category and the notification message that are hidden in the second screen lock state or the second working mode.

In a first possible implementation manner, the hiding unit is further configured to: in the second screen lock state or the second working mode, when content of the received notification message matches content of a preset shielding library, hide the notification message, where the preset shielding library is a set of shielded content that is set in advance.

With reference to the first possible implementation manner of the second aspect, in a second possible implementation manner, the content of the notification message includes at least one of the following: information about a sender of the notification message, and text content, image content, or video content of the notification message.

With reference to the second aspect or with reference to the first or the second possible implementation manner of the second aspect, in a third possible implementation manner, the classifying unit is specifically configured to: receive the first switch information and enter the first working mode; in the first working mode, receive classification instruction information; and classify the data into at least two categories according to the classification instruction information.

With reference to the second aspect or with reference to the first, the second, or the third possible implementation manner of the second aspect, in a fourth possible implementation manner, the first screen lock state is a screen lock state that the terminal enters when an instruction for exiting the first working mode or a first screen lock instruction is received, or when first preset screen lock time arrives; and the second screen lock state is a screen lock state that the terminal enters when an instruction for exiting the second working mode or a second screen lock instruction is received, or when second preset screen lock time arrives.

With reference to the second aspect or with reference to the first, the second, the third, or the fourth possible implementation manner of the second aspect, in a fifth possible implementation manner, the data stored on the terminal includes at least one of the following: contact information, a call record, an SMS message, an email, an image, a video, and a software application.

With reference to the fifth possible implementation manner of the second aspect, in a sixth possible implementation manner, the contact information includes at least a contact name and a phone number.

A third aspect of the embodiments of the present invention provides an apparatus for processing data and a message, where the apparatus may include: a processor and a memory that works with the processor, where: the memory is configured to store data and a program to be executed by the processor; and the processor is configured to: receive first switch information, enter a first working mode, and classify the data stored on the memory; in a first screen lock state or the first working mode, when a notification message related to the data is received, display the notification message related to the data; receive second switch information, enter a second working mode, and hide, according to classification of the data, data of a specified category and a notification message related to the data of the specified category; in a second screen lock state or the second working mode, when the notification message related to the data of the specified category is received, hide the notification message; and receive the first switch information, enter the first working mode, and display the data of the specified category and the notification message that are hidden.

In a first possible implementation manner, the processor is further configured to: in the second screen lock state or the second working mode, when content of the received notification message matches content of a preset shielding library, hide the notification message, where the preset shielding library is a set of shielded content that is set in advance, and the content of the notification message includes at least one of the following: information about a sender of the notification message, and text content, image content, or video content of the notification message.

With reference to the third aspect or with reference to the first possible implementation manner of the third aspect, in a second possible implementation manner, the first screen lock state is a screen lock state that the terminal enters when an instruction for exiting the first working mode or a first screen lock instruction is received, or when first preset screen lock time arrives; and the second screen lock state is a screen lock state that the terminal enters when an instruction for exiting the second working mode or a second screen lock instruction is received, or when second preset screen lock time arrives. The data stored on the terminal includes at least one of the following: contact information, a call record, an SMS message, an email, an image, a video, and a software application.

Implementing the embodiments of the present invention brings the following beneficial effects.

Two working modes are configured, and different hiding and displaying processing is performed on data and a notification message related to the data in different working modes, thereby being capable of implementing that privacy of a user is protected without affecting proper use of a terminal by multiple users. When the terminal enters a first working mode from a second working mode, data and a related notification message that are hidden in the second working mode are displayed in time, so that the user does not miss a newly received notification message, thereby providing convenience for use.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
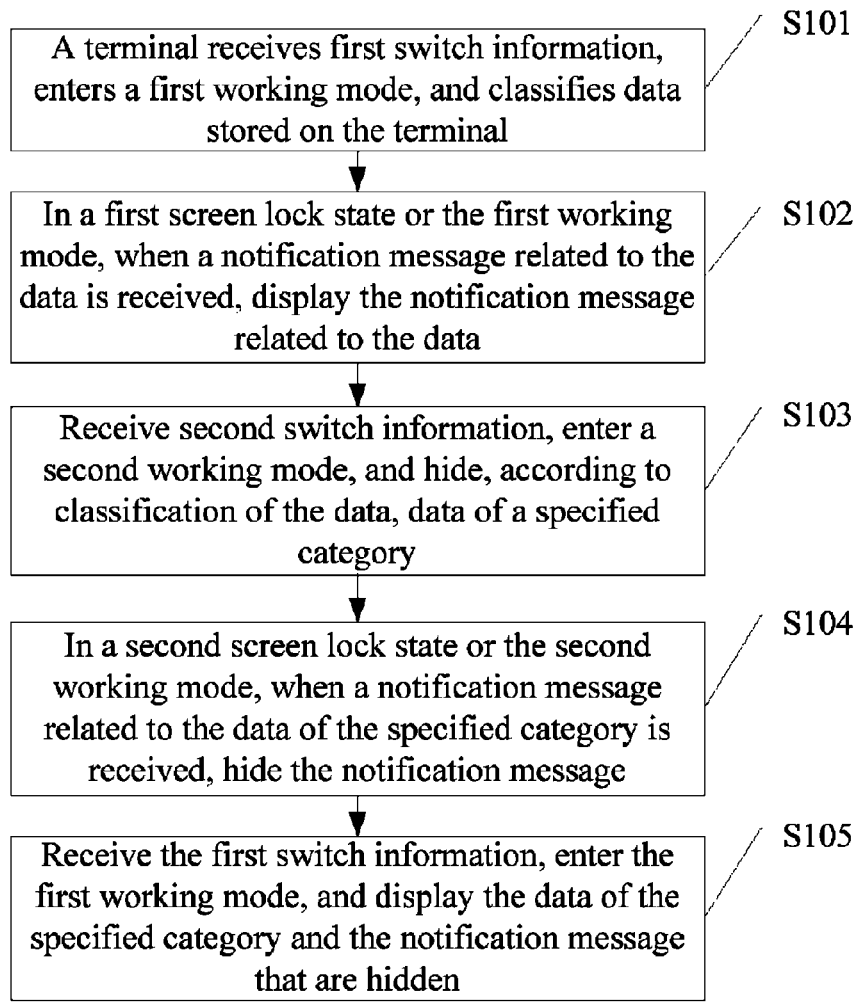
FIG. 1 is a schematic flowchart of a method for processing data and a message according to a first embodiment of the present invention.

Referring to FIG. 1, FIG. 1 is a schematic flowchart of a method for processing data and a message according to a first embodiment of the present invention. In this embodiment, the method includes the following steps:

S101. A terminal receives first switch information, enters a first working mode, and classifies data stored on the terminal.

Specifically, the first switch information may be input in a screen lock state of the terminal, and certainly, may also be input on a normal operation user interface of the terminal. A format of the first switch information may be various passwords that are preset by a user, such as a digit, a letter, an image, a sound, a biological characteristic (such as a fingerprint), or a gesture. For example, in the screen lock state, the user may enter the first working mode by inputting an "M"-shaped gesture. Generally, because the terminal is used by the user for most of the time, the first working mode is a normal working mode of the terminal. In this mode, the user has highest setting and access control permission on the data stored on the terminal, and can classify the data stored on the terminal. The data may be contact information, a call record, an SMS message, an email, an image, a video, a software application, and the like, and certainly, may also be other data such as an audio. Using contact information as an example, data, such as information data of a contact A among relatives, included in contact information in a contact list may be set to a privacy category, and information data of a contact B among colleagues may be set to a public category. In this way, information related to the contact A, for example, a contact name and a phone number, and all or a part of data related to the contact A are identified as the privacy category by the terminal. Certainly, the contact information may further include but is not limited to: an office phone number, a mobile phone number, a fax number, an email address, an instant messaging software identifier (ID), a microblog ID, a personal home page, a company, a residential address, a postal code, a birthday, an avatar, a vehicle license plate number, a bank account, and the like. In this way, all the related data is identified as the privacy category by the terminal; in addition, a notification message related to the data is also identified as the privacy category. For example, the information of the contact A includes a QQ number of A; accordingly, a message pushed by the QQ number to the terminal is also identified as the privacy category. Specifically, the notification message may be a push message of instant messaging software, or a prompt message of a new call, a new SMS message, or a new email, or may also be a prompt message of a prompting software application such as a memo or a schedule, or the like.

S102. In a first screen lock state or the first working mode, when a notification message related to the data is received, display the notification message related to the data.

Specifically, the first screen lock state is a screen lock state that the terminal enters when an instruction for exiting the first working mode or a first screen lock instruction is received, or when first preset screen lock time arrives. In the first screen lock state or the first working mode, when the notification message related to the data is received, the notification message related to the data is displayed. For example, when an SMS message is received from the contact A in the contact information, a notification message is displayed normally; and when a QQ message is received from the contact A in the contact information, a notification message is also displayed normally. In this state, the terminal processes the notification message normally, regardless of whether the notification message is related to data of the privacy category or the public category.

S103. Receive second switch information, enter a second working mode, and hide, according to classification of the data, data of a specified category.

Specifically, the second switch information may be input in the screen lock state of the terminal. Certainly, the terminal may also directly enter the second mode from the first working mode. The present invention limits only a different working mode corresponding to different switch information, but sets no limitation on how to enter a different working mode. A format of the switch information may be various passwords that are preset by a user, such as a digit, a letter, an image, a sound, a biological characteristic (such as a fingerprint), or a gesture. For example, in the screen lock state, the user may enter the second working mode by inputting an "N"-shaped gesture. Generally, the first switch information is set to be relatively complex to prevent another user from learning the first switch information only by a simple attempt, and the second switch information may be set to be relatively simple, so that the user can easily input the second switch information or tell another user to input the second switch information. The second switch information may be input by the user when the user hands the terminal over to another user, or the another user may be told to input the second switch information, or prompt information may also be provided in the first screen lock state of the terminal to facilitate inputting by the another user. For example, on the first screen lock state interface of the terminal, "Slide left to unlock" is displayed. Accordingly, the user only needs to slide left on a screen of the terminal to enter the second working mode from the first screen lock state. In the second working mode, the terminal hides the data of the specified category that is classified in the first working mode. If the terminal receives, in the second working mode, a notification message related to the data of the privacy category, the terminal also hides the notification message of this type, and displays other notification messages normally. For example, in the first working mode, information of the contact A among relatives is set to the privacy category, and information of the contact B among colleagues is set to the public category; accordingly, when entering the second working mode, the terminal hides the information of the contact A to prevent another user from viewing the information of the contact A when using the mobile phone; in addition, in the second working mode, if the terminal receives a notification message related to the information of the contact A, the terminal also hides the notification message. For example, an SMS message or an email related to A is hidden in the second working mode; when a notification message, for example, a message such as a notification indicating a new SMS message from the contact A or a notification indicating a new email, related to the SMS message or email of the contact A is received, the notification message related to the data and the data itself are hidden. However, the data of the public category and a notification message related to the data of the public category do not need to be hidden.

S104. In a second screen lock state or the second working mode, when a notification message related to the data of the specified category is received, hide the notification message.

Specifically, the second screen lock state is a screen lock state that the terminal enters when an instruction for exiting the second working mode or a second screen lock instruction is received, or when second preset screen lock time arrives. In the second screen lock state or the second working mode, another user that is using the mobile phone cannot browse data or a notification message of the privacy category that is specified. In addition, when a notification message, for example, a new call, a new SMS message, a new email, or a new push message of instant messaging software of the contact A, related to the information of the contact A that is specified as the privacy category is received, the notification message is also hidden. Specifically, when the information of the contact A is received, the terminal may compare the received notification message with the data that is set to the privacy category, for example, by using keyword comparison or image recognition, thereby being capable of determining whether the received notification message is related to the data specified as the privacy category. A manner in which the notification message is hidden may be configured differently according to a category of data. For example, regarding an email address that is specified as the privacy category, when a new email is received from the email address, the new email may be directly hidden without any prompt; and regarding a new call of the contact A that is specified as the privacy category, after comparison is performed, only a calling number may be displayed, and a name of the associated contact A is not displayed, which helps a user to view and learn a missed call in time. Certainly, the call may also be directly rejected without any prompt.

S105. Receive the first switch information, enter the first working mode, and display the data of the specified category and the notification message that are hidden.

Specifically, the first switch information may be input in the screen lock state of the terminal, and certainly, may also be input on the normal operation interface of the terminal. The present invention limits only a different working mode corresponding to different switch information, but sets no limitation on how to enter a different working mode. The format of the first switch information may be various passwords that are preset by a user, such as a digit, a letter, an image, a sound, or a gesture. When entering the first working mode, the terminal displays all the data of the specified category and the notification message related to the data of the specified category that are hidden in the second mode, so that the user views the notification message that is hidden in the second working mode, because for the user, the notification message that is hidden in the second working mode is information unknown to the user. A specific displaying manner may be prompting the user by using a system message, or prompting the user by using a drop-down notification bar of the terminal, or prompting the user by using a software application related to the data in a manner of a message, a sound, or vibration.

The following describes the method for processing information according to this embodiment in detail by using a call as an example.

A terminal first receives first switch information, enters a first working mode, and classifies contact information stored on the terminal: sets a contact A to a privacy category, and sets a contact B to a public category.

The terminal enters a first screen lock state when an instruction for exiting the first working mode or a first screen lock instruction is received, or when first preset screen lock time arrives; and in the first screen lock state or the first working mode, when a call or an SMS message is received from the contact A and the contact B, displays a notification message of the call and a notification message of the SMS message, and a user may answer or reject the call freely, and view content of the SMS message freely.

Receive second switch information, enter a second working mode, and hide, according to classification of the contact A and the contact B, data of the contact A and a notification message, for example, a call record or an SMS message record, related to the contact A.

The terminal enters a second screen lock state when an instruction for exiting the second working mode or a second screen lock instruction is received, or when second preset screen lock time arrives; and in the second screen lock state or the second working mode, when a call or an SMS message is received from the contact A, directly hides the call or SMS message of the contact A, or displays only a number and does not display a name of the contact A; when the phone number of the contact A is dialed, directly rejects the dialing of the phone number of the contact A, or displays the dialing normally, but displays only the number and does not display the name of the contact A; and when a call or an SMS message is received from the contact B, displays a name and a number of the contact B normally.

Receive the first switch information, enter the first working mode, and display a notification message of a new call or a notification message of a new SMS message of the contact A.

Certainly, in addition, an SMS message, an email, and the like may also be processed in the same manner, and details are not repeated herein. Regarding notification information of instant messaging software, when an instant messaging message is received from a contact of the privacy category or when an image or a video included in content of a received message is related to a contact of the privacy category, for example, the terminal is used to recognize, by using an image recognition technology, that the content is related to data of the privacy category in this case, the content may be directly hidden or the user is prompted to log in to the instant messaging software, and a user except an owner of the terminal cannot log in because the user does not have a password, and therefore cannot view the message content. An existing image, video, or particular software application, such as AliPay, on the terminal may be directly set to the privacy category and hidden according to a user requirement.

Two working modes are configured, and different hiding and displaying processing is performed on data and a notification message related to the data in different working modes, thereby being capable of implementing that privacy of a user is protected without affecting proper use of a terminal by multiple users. When the terminal enters a first working mode from a second working mode, data and a related notification message that are hidden in the second working mode are displayed in time, so that the user does not miss a newly received notification message, thereby providing convenience for use.

In this embodiment, a manner in which data and a notification message related to the data are processed in two working modes is provided. Certainly, three or more working modes may also be set, different privacy levels are set for data, and data at a different level is hidden in a different working mode, thereby achieving an objective of protecting user privacy under a precondition that a function of a mobile phone is implemented.

Figure 2:
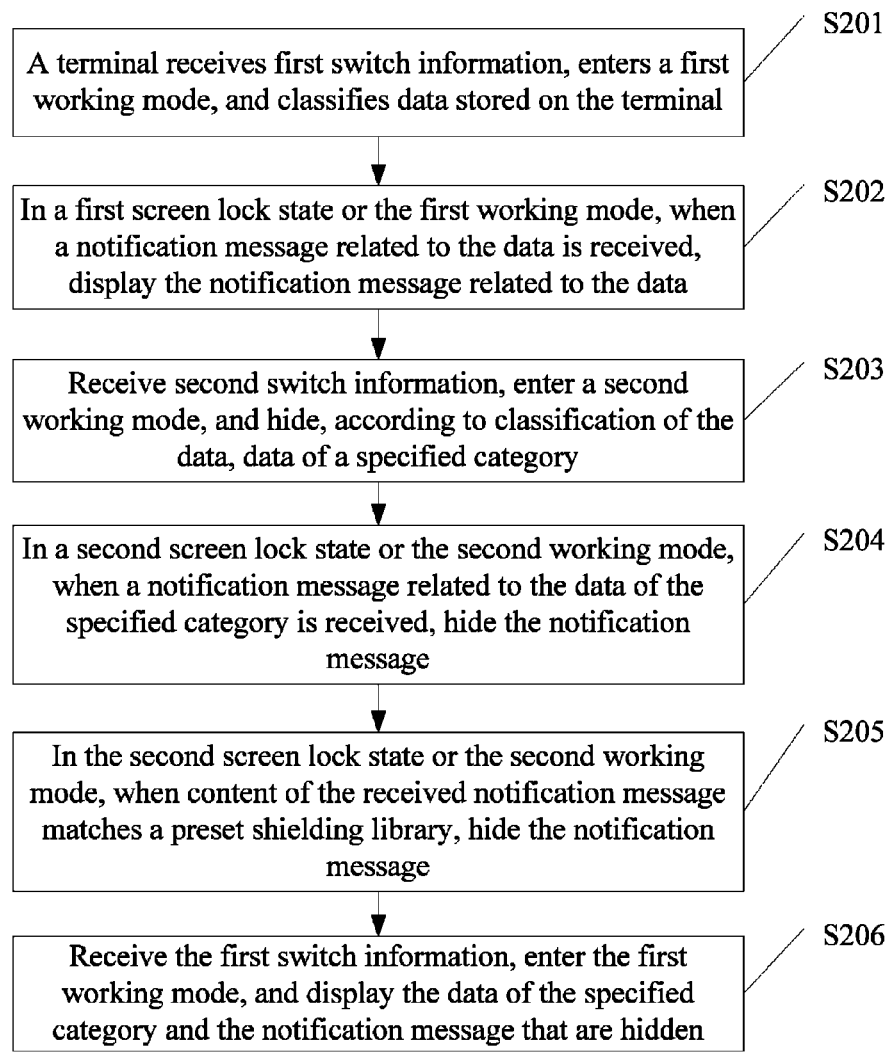
FIG. 2 is a schematic flowchart of a method for processing data and a message according to a second embodiment of the present invention.

Referring to FIG. 2, FIG. 2 is a schematic flowchart of a method for processing data and a message according to a second embodiment of the present invention. In this embodiment, the method includes the following steps:

S201. A terminal receives first switch information, enters a first working mode, and classifies data stored on the terminal.

Specifically, the first switch information may be input in a screen lock state of the terminal, and certainly, may also be input on a normal operation interface of the terminal. A format of the first switch information may be various passwords that are preset by a user, such as a digit, a letter, an image, a sound, a biological characteristic (such as a fingerprint), or a gesture. For example, in the screen lock state, the user may enter the first working mode by inputting an "M"-shaped gesture. Generally, because the terminal is used by the user for most of the time, the first working mode is a normal working mode of the terminal. In this mode, the user can classify the data stored on the terminal. The data may be contact information, a call record, an SMS message, an email, an image, a video, a software application, and the like, and certainly, may also be other data such as an audio. Using contact information as an example, data, such as information data of a contact A among relatives, included in contact information may be set to a privacy category, and information data of a contact B among colleagues may be set to a public category. In this way, information related to the contact A, for example, a contact name and a phone number, is identified as the privacy category by the terminal. Certainly, the contact information may further include but is not limited to: an office phone number, a mobile phone number, a fax number, an email address, an instant messaging software ID, a microblog ID, a personal home page, a company, a residential address, a postal code, a birthday, an avatar, a vehicle license plate number, a bank account, and the like. In this way, all the related data is identified as the privacy category by the terminal; in addition, a notification message related to the data is also identified as the privacy category. For example, the information of the contact A includes a QQ number of A; accordingly, a message pushed by the QQ number to the terminal is also identified as the privacy category.

S202. In a first screen lock state or the first working mode, when a notification message related to the data is received, display the notification message related to the data.

Specifically, the first screen lock state is a screen lock state that the terminal enters when an instruction for exiting the first working mode or a first screen lock instruction is received, or when first preset screen lock time arrives. In the first screen lock state or the first working mode, when the notification message related to the data is received, the notification message related to the data is displayed. For example, when an SMS message is received from the contact A in the contact information, a notification message is displayed normally; and when a QQ message is received from the contact A in the contact information, a notification message is also displayed normally. In this state, the terminal processes the notification message normally.

S203. Receive second switch information, enter a second working mode, and hide, according to classification of the data, data of a specified category.

Specifically, the second switch information may be input in the screen lock state of the terminal, and certainly, may also be input on the normal operation interface of the terminal. A format of the second switch information may be various passwords that are preset by a user, such as a digit, a letter, an image, a sound, a biological characteristic (such as a fingerprint), or a gesture. For example, in the screen lock state, the user may enter the second working mode by inputting an "N"-shaped gesture. Generally, the first switch information is set to be relatively complex to prevent another user from learning the first switch information only by a simple attempt, and the second switch information may be set to be relatively simple, so that the user can easily input the second switch information or tell another user to input the second switch information. The second switch information may be input by the user when the user hands the terminal over to another user, or the another user may be told to input the second switch information, or prompt information may also be provided in the first screen lock state of the terminal to facilitate inputting by the another user. For example, on the first screen lock state interface of the terminal, "Slide left to unlock" is displayed. Accordingly, the user only needs to slide left on a screen of the terminal to enter the second working mode from the first screen lock state. In the second working mode, the terminal hides the data of the specified category that is classified in the first working mode and a notification message related to the data of the specified category. For example, in the first working mode, information of the contact A among relatives is set to the privacy category, and information of the contact B among colleagues is set to the public category; accordingly, when entering the second working mode, the terminal hides the information of the contact A and a notification message related to the information of the contact A, so as to prevent another user from viewing the information of the contact A and the notification message related to the information of the contact A when using the mobile phone. For example, a call record, an SMS message, an email, an image, or a video related to A is hidden when the terminal enters the second working mode. However, the data of the public category does not need to be hidden.

S204. In a second screen lock state or the second working mode, when a notification message related to the data of the specified category is received, hide the notification message.

Specifically, the second screen lock state is a screen lock state that the terminal enters when an instruction for exiting the second working mode or a second screen lock instruction is received, or when second preset screen lock time arrives. In the second screen lock state or the second working mode, another user that is using the mobile phone cannot browse data of the privacy category that is specified. In addition, when a notification message, for example, a new call, a new SMS message, a new email, or a new push message of instant messaging software of the contact A, related to the information of the contact A that is specified as the privacy category is received, the notification message is also hidden. Specifically, when the information of the contact A is received, the terminal may compare the received notification message with the data that is set to the privacy category, for example, by using keyword comparison or image recognition, thereby being capable of determining whether the received notification message is related to the data specified as the privacy category. A manner in which the notification message is hidden may be configured differently according to a category of data. For example, regarding an email address that is specified as the privacy category, when a new email is received from the email address, the new email may be directly hidden without any prompt; and regarding a new call of the contact A that is specified as the privacy category, after comparison is performed, only a calling number may be displayed, and a name of the associated contact A is not displayed, which helps a user to view and learn a missed call in the second working mode in time. Certainly, the call may also be directly rejected without any prompt.

S205. In the second screen lock state or the second working mode, when content of the received notification message matches content of a preset shielding library, hide the notification message.

The preset shielding library is a set of shielded content that is set in advance. The content of the notification message may include but is not limited to at least one of the following: information about a sender of the notification message, and text content, image content, or video content of the notification message. Matching between the content of the notification message and the content of the preset shielding library specifically includes that: the information about the sender of the notification message, for example, a sending number or a sending uniform resource locator (URL), matches a number or a URL recorded in the preset shielding library; or sent content of the notification message includes a sensitive word, a sensitive image, or the like recorded in the shielding library, for example, includes a sensitive word of "salary" or includes a contact photo of the privacy category. The matching herein only requires that the content of the notification message matches any content in the preset shielding library.

In step S204, hiding data of a specified category and a related notification message may be implemented by specifying a category for the data. For some comparatively sensitive information, a public shielding library may further be preset to compare and hide a received notification message, such as a notification message from a bank, or a notification message from a hospital. For example, 95555 is not stored on a terminal of a user, that is, the number 95555 cannot be set to a privacy category on the terminal in advance. However, because a message sent by the number 95555 relates to property security of the user, a shielding library may be preset to record the number. When information sent by the number is received, a notification message of the information and content of the information are hidden, or the content of the information is further compared with content of the preset shielding library, and if the content of the information includes a sensitive word in the shielding library, for example, information such as "salary" or "amount", the notification message of the information and the content of the information are hidden.

S206. Receive the first switch information, enter the first working mode, and display the data of the specified category and the notification message that are hidden.

Specifically, the first switch information may be input in the screen lock state of the terminal, and certainly, may also be input on the normal operation interface of the terminal. The format of the first switch information may be various passwords that are preset by a user, such as a digit, a letter, an image, a sound, a biological characteristic (such as a fingerprint), or a gesture. When entering the first working mode, the terminal displays all the data of the specified category and the notification message related to the data of the specified category that are hidden in the second mode, as well as the notification message that matches the content of the preset shielding library and therefore is hidden, so that the user views a new notification message. A specific displaying manner may be prompting the user by using a system message, or prompting the user by using a drop-down notification bar of the terminal, or prompting the user by using a software application related to the data in a manner of a message, a sound, or vibration.

The following describes the method for processing information according to this embodiment in detail by using an email as an example.

A terminal first receives first switch information, enters a first working mode, and classifies email addresses stored on the terminal: sets an email address A to a privacy category, and sets an email address B to a public category.

The terminal enters a first screen lock state when an instruction for exiting the first working mode or a first screen lock instruction is received, or when first preset screen lock time arrives; and in the first screen lock state or the first working mode, when an email is received from the email address A or the email address B, displays a notification message of the email, and a user may view content of the email at any time.

Receive second switch information, enter a second working mode, and hide, according to classification of the email address A and the email address B, the email received from the email address A and a notification message related to a contact A.

The terminal enters a second screen lock state when an instruction for exiting the second working mode or a second screen lock instruction is received, or when second preset screen lock time arrives; and in the second screen lock state or the second working mode, when an email is received from the email address A, directly hides the email received from the email address A. Certainly, only the email address may be displayed, other information, such as a name, related to the email address is not displayed, and a user cannot view content of the email.

When an email is received from an email address C that does not exist or is not classified on the terminal, determine whether the email address C and email content received from the email address C match content of a preset shielding library; and if the email address C and the email content match the content of the preset shielding library, directly hide the email received from the email address A or display only the email address, and the user cannot view the email content.

Receive the first switch information, enter the first working mode, and display an email notification message of the email address A and the email address C, and the user can view the email content freely.

Certainly, in addition, some particular software applications on the terminal, for example, prompting software such as a memo, a voice prompt, a note, and a schedule, may also be compared, according to prompt content of the prompting software, with data of a set hidden category. For example, an appointment with Zhang San on Friday in prompted. Because Zhang San is a contact of the hidden category, a notification message of the prompt is hidden in the second working mode. In addition, even if the prompt content is irrelevant to the data of the hidden category, if the prompt content matches a sensitive word, for example, "appointment", in the shielding library, the notification message of the prompt content is identified as the privacy category, and is also hidden in the second working mode.

In this embodiment, a solution for comparing with content of a preset shielding library and hiding a sensitive notification message is provided, and can further ensure privacy security of a user.

Figure 3:
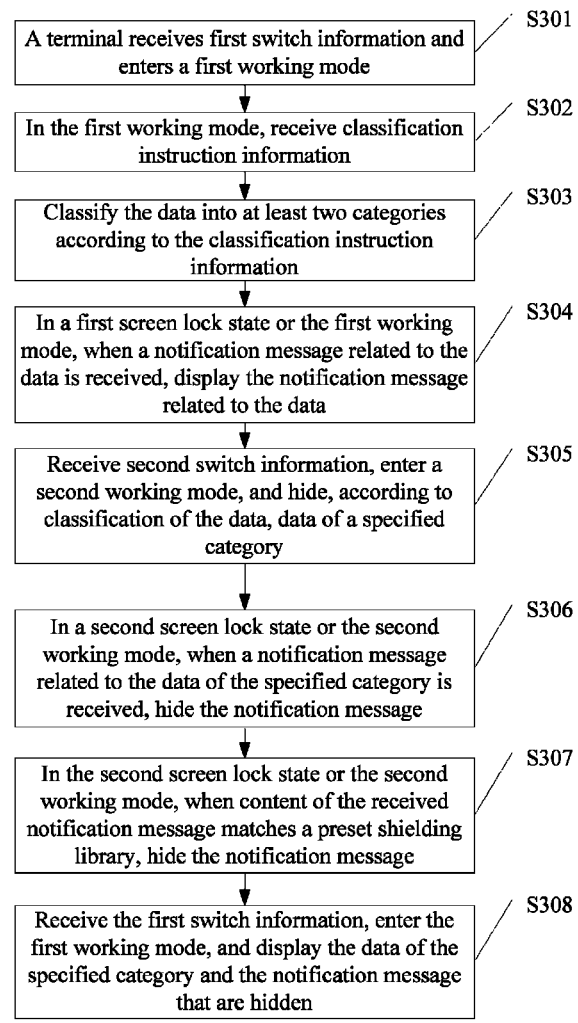
FIG. 3 is a schematic flowchart of a method for processing data and a message according to a third embodiment of the present invention.

Referring to FIG. 3, FIG. 3 is a schematic flowchart of a method for processing data and a message according to a third embodiment of the present invention. In this embodiment, the method includes the following steps:

S301. A terminal receives first switch information and enters a first working mode.

Specifically, the first switch information may be input in a screen lock state of the terminal, and certainly, may also be input on a normal operation interface of the terminal. A format of the first switch information may be various passwords that are preset by a user, such as a digit, a letter, an image, a sound, a biological characteristic (such as a fingerprint), or a gesture. For example, in the screen lock state, the user may enter the first working mode by inputting an "M"-shaped gesture. Generally, because the terminal is used by the user for most of the time, the first working mode is a normal working mode of the terminal. In this mode, the user can classify data stored on the terminal. The data may be contact information, a call record, an SMS message, an email, an image, a video, a software application, and the like, and certainly, may also be other data such as an audio. Using contact information as an example, data, such as information data of a contact A among relatives, included in contact information may be set to a privacy category, and information data of a contact B among colleagues may be set to a public category. In this way, information related to the contact A, for example, a contact name and a phone number, is identified as the privacy category by the terminal. Certainly, the contact information may further include but is not limited to: an office phone number, a mobile phone number, a fax number, an email address, an instant messaging software ID, a microblog ID, a personal home page, a company, a residential address, a postal code, a birthday, an avatar, a vehicle license plate number, a bank account, and the like. In this way, all the related data is identified as the privacy category by the terminal; in addition, a notification message related to the data is also identified as the privacy category. For example, the information of the contact A includes a QQ number of A; accordingly, a message pushed by the QQ number to the terminal is also identified as the privacy category.

S302. In the first working mode, receive classification instruction information.

Specifically, the classification instruction information is input by the user on the terminal and instructs the terminal to classify, according to a requirement of the user, the data on the terminal.

S303. Classify the data into at least two categories according to the classification instruction information.

During classification, the data may be classified into at least a privacy category and a public category; certainly, the data may also be classified into three or more categories according to an actual requirement. In addition, a displaying and hiding relationship of each category of data in a corresponding working mode is configured. For example, the data is classified into three categories, where a first privacy category has a highest privacy level, a second privacy category has a second highest privacy level, and a third category is a public category; accordingly, three working modes may be set correspondingly, where the first privacy category is displayed only in a first working mode, the second privacy category is displayed in the first working mode and a second working mode, and the public category is displayed in any working mode. Certainly, the number of categories of the data and the number of working modes may be the same or different.

S304. In a first screen lock state or the first working mode, when a notification message related to the data is received, display the notification message related to the data.

Specifically, the first screen lock state is a screen lock state that the terminal enters when an instruction for exiting the first working mode or a first screen lock instruction is received, or when first preset screen lock time arrives. In the first screen lock state or the first working mode, when the notification message related to the data is received, the notification message related to the data is displayed. For example, when an SMS message is received from the contact B in the contact information, a notification message is displayed normally; and when a QQ message is received from the contact B in the contact information, a notification message is also displayed normally. In this state, the terminal processes the notification message normally.

S305. Receive second switch information, enter a second working mode, and hide, according to classification of the data, data of a specified category.

Specifically, the second switch information may be input in a second screen lock state of the terminal, and certainly, may also be input on the normal operation interface of the terminal. A format of the second switch information may be various passwords that are preset by a user, such as a digit, a letter, an image, a sound, or a gesture. For example, in the screen lock state, the user may enter the second working mode by inputting an "N"-shaped gesture. Generally, the first switch information is set to be relatively complex to prevent another user from learning the first switch information only by a simple attempt, and the second switch information may be set to be relatively simple, so that the user can easily input the second switch information or tell another user to input the second switch information. The second switch information may be input by the user when the user hands the terminal over to another user, or the another user may be told to input the second switch information, or prompt information may also be provided in the first screen lock state of the terminal to facilitate inputting by the another user. For example, on the first screen lock state interface of the terminal, "Slide left to unlock" is displayed. Accordingly, the user only needs to slide left on a screen of the terminal to enter the second working mode from the first screen lock state. In the second working mode, the terminal hides the data of the specified category that is classified in the first working mode and a notification message related to the data of the specified category. For example, in the first working mode, information of the contact A among relatives is set to the privacy category, and information of the contact B among colleagues is set to the public category; accordingly, when entering the second working mode, the terminal hides the information of the contact A and a notification message related to the information of the contact A, so as to prevent another user from viewing the information of the contact A and the notification message related to the information of the contact A when using the mobile phone. For example, a call record, an SMS message, an email, an image, or a video related to A is hidden when the terminal enters the second working mode. However, the data of the public category does not need to be hidden.

S306. In a second screen lock state or the second working mode, when a notification message related to the data of the specified category is received, hide the notification message.

Specifically, the second screen lock state is a screen lock state that the terminal enters when an instruction for exiting the second working mode or a second screen lock instruction is received, or when second preset screen lock time arrives. In the second screen lock state or the second working mode, another user that is using the mobile phone cannot browse data or a notification message of the privacy category that is specified. In addition, when a notification message, for example, a new call, a new SMS message, a new email, or a new push message of instant messaging software of the contact A, related to the information of the contact A that is specified as the privacy category is received, the notification message is also hidden. Specifically, when the information of the contact A is received, the terminal may compare the received notification message with the data that is set to the privacy category, for example, by using keyword comparison or image recognition, thereby being capable of determining whether the received notification message is related to the data specified as the privacy category. A manner in which the notification message is hidden may be configured differently according to a category of data. For example, regarding an email address that is specified as the privacy category, when a new email is received from the email address, the new email may be directly hidden without any prompt; and regarding a new call of the contact A that is specified as the privacy category, after comparison is performed, only a calling number may be displayed, and a name of the associated contact A is not displayed, which helps a user to view and learn a missed call in time. Certainly, the call may also be directly rejected without any prompt.

S307. In the second screen lock state or the second working mode, when content of the received notification message matches content of a preset shielding library, hide the notification message.

The preset shielding library is a set of shielded content that is set in advance. The content of the notification message may include but is not limited to at least one of the following: information about a sender of the notification message, and text content, image content, or video content of the notification message.

In step S306, hiding data of a specified category and a related notification message may be implemented by specifying a category for the data. For some comparatively sensitive information, a public shielding library may further be preset to compare and hide a received notification message, such as a notification message from a bank, or a notification message from a hospital. For example, 95555 is not stored on a terminal of a user; however, because a message sent by the number 95555 relates to property security of the user, a shielding library may be preset to record the number. When a notification message sent by the number is received, content of the notification message is compared with content of the preset shielding library, and if the content of the notification message includes a sensitive word, for example, information such as "salary", in the shielding library, the notification information is hidden.

S308. Receive the first switch information, enter the first working mode, and display the data of the specified category and the notification message that are hidden.

Specifically, the first switch information may be input in the screen lock state of the terminal, and certainly, may also be input on the normal operation interface of the terminal. The format of the first switch information may be various passwords that are preset by a user, such as a digit, a letter, an image, a sound, or a gesture. When entering the first working mode, the terminal displays all the data of the specified category and the notification message related to the data of the specified category that are hidden in the second mode, as well as the notification message that matches the content of the preset shielding library and therefore is hidden, so that the user views a new notification message. A specific displaying manner may be prompting the user by using a system message, or prompting the user by using a drop-down notification bar of the terminal, or prompting the user by using a software application related to the data in a manner of a message, a sound, or vibration.

Data on a terminal is classified in detail, so that a most suitable working mode can be released for a user that uses a mobile phone, thereby refining privacy protection.

The following describes some frequently used applications by using a mobile phone that is most common as an example. Certainly, all other terminal devices that provide a same application may use a same processing method.

Figure 4:
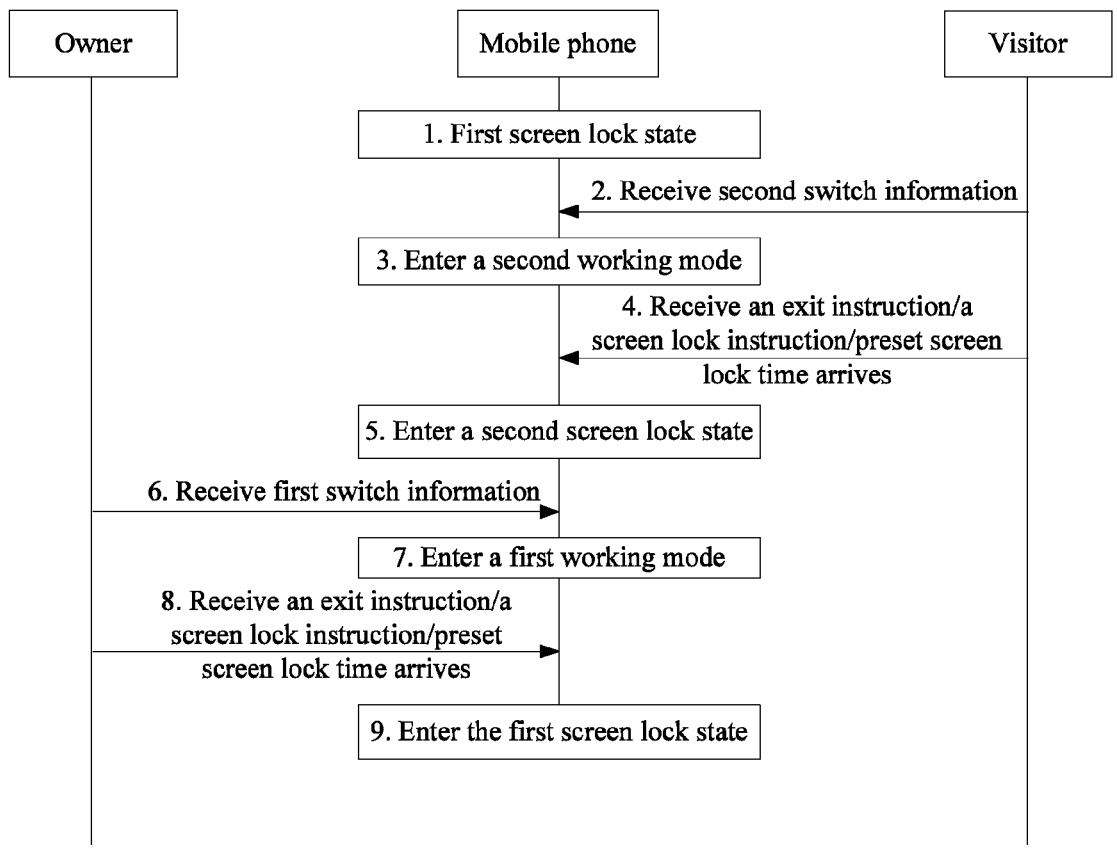
FIG. 4 is a schematic flowchart of switching a working mode of a mobile phone terminal by using a method for processing data and a message according to the present invention.

Referring to FIG. 4, FIG. 4 is a schematic flowchart of switching a working mode of a mobile phone terminal by using a method for processing data and a message according to the present invention. As shown in the figure, a process of the method includes the following steps:

1. A mobile phone is in a first screen lock state.

The first screen lock state is a screen lock state that the mobile phone enters when an instruction for exiting the first working mode or a first screen lock instruction is received, or when first preset screen lock time arrives. Generally, because the mobile phone terminal is used by an owner for most of the time, the first working mode is a normal working mode of the mobile phone. In this mode, a user can classify data stored on the terminal. The first screen lock state is a normal screen lock state of the mobile phone.

2. Receive second switch information.

The second switch information may be input in a screen lock state of the mobile phone, and certainly, may also be input on a normal operation interface of the mobile phone. A format of the second switch information may be various passwords that are preset by the owner, such as a digit, a letter, an image, a sound, a biological characteristic, or a gesture. For example, in the screen lock state, the owner may enter the second working mode by inputting an "N"-shaped gesture. Generally, the first switch information is set to be relatively complex to prevent another visitor from learning the first switch information only by a simple attempt, and the second switch information may be set to be relatively simple, so that the owner can easily input the second switch information or tell another visitor to input the second switch information. The second switch information may be input by the owner when the owner hands the terminal over to another visitor, or the another visitor may be told to input the second switch information, or prompt information may also be provided in the first screen lock state of the mobile phone to facilitate inputting by the another visitor. For example, on the first screen lock state interface of the mobile phone, "Slide left to unlock" is displayed. Accordingly, the visitor only needs to slide left on a screen of the terminal to enter the second working mode from the first screen lock state.

3. Enter a second working mode.

4. Receive an exit instruction/a screen lock instruction/preset screen lock time arrives.

5. Enter a second screen lock state.

6. Receive first switch information.

7. Enter a first working mode.

The first switch information may be input in the screen lock state of the mobile phone, and certainly, may also be input on the normal operation interface of the mobile phone. A format of the first switch information may be various passwords that are preset by the owner, such as a digit, a letter, an image, a sound, a biological characteristic (such as a fingerprint), or a gesture. For example, in the second screen lock state, the user may enter the first working mode by inputting an "M"-shaped gesture.

8. Receive an exit instruction/a screen lock instruction/preset screen lock time arrives.

9. Enter the first screen lock state.

The mobile phone may work in a different working mode by receiving different switch information; in addition, a switching manner may be varied and set by the owner freely, so that switching is simple, convenient, and effective.

Figure 5:
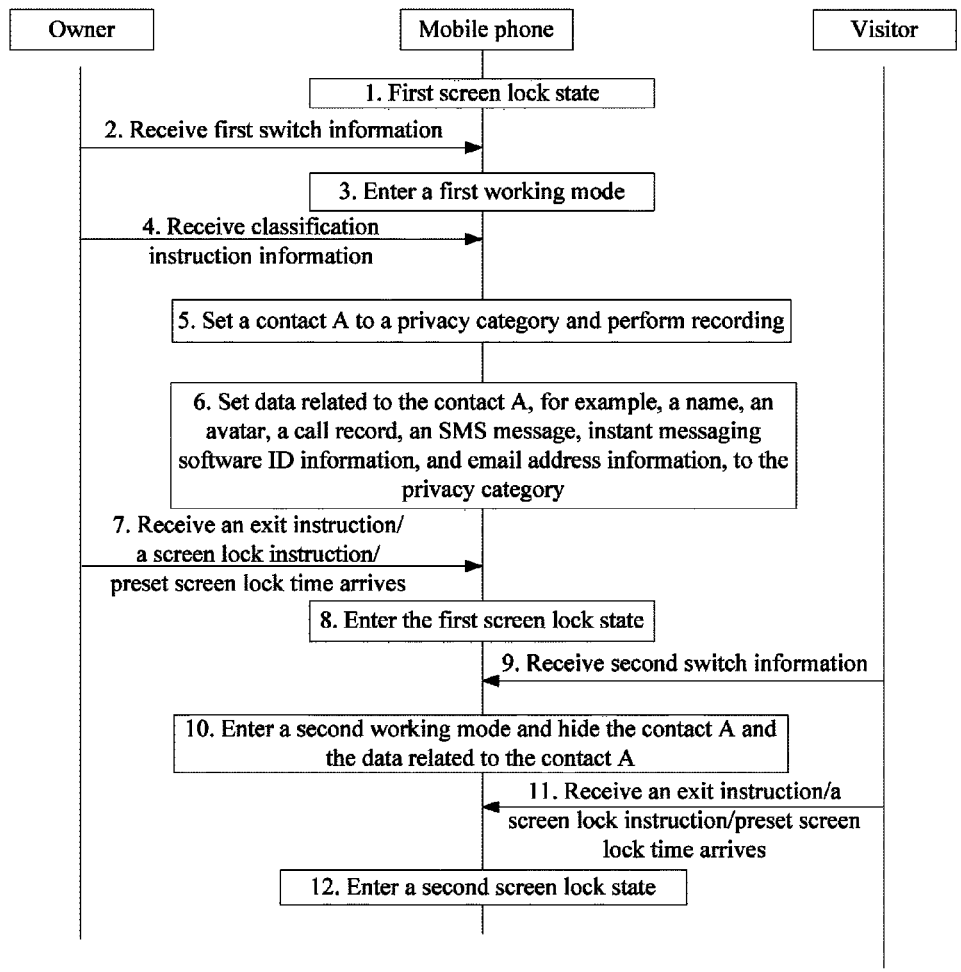
FIG. 5 is a schematic flowchart of hiding contact information and data related to a contact on a mobile phone by using a method for processing data and a message according to the present invention.

Referring to FIG. 5, FIG. 5 is a schematic flowchart of hiding contact information and data related to a contact on a mobile phone by using a method for processing data and a message according to the present invention. As shown in the figure, a process of the method includes the following steps:

1. A first screen lock state.
2. Receive first switch information.
3. Enter a first working mode.
4. Receive classification instruction information.

The classification instruction information is input by an owner on the mobile phone and instructs the mobile phone to classify, according to a requirement of the owner, data on the mobile phone.

5. Set a contact A to a privacy category and perform recording.

6. Set data related to the contact A, for example, a name, an avatar, a call record, an SMS message, instant messaging software ID information, and email address information, to the privacy category.

Generally, in a contact list of the mobile phone, contact information includes at least a name and a phone number of a contact, and certainly, may further include but is not limited to: an office phone number, a mobile phone number, a fax number, an email address, an instant messaging software ID, a microblog ID, a personal home page, a company, a residential address, a postal code, a birthday, an avatar, a vehicle license plate number, a bank account, and the like. In this way, when the contact A is set to the privacy category, all the related data described above is identified as the privacy category by the mobile phone.

7. Receive an exit instruction/a screen lock instruction/preset screen lock time arrives.

8. Enter the first screen lock state.

9. Receive second switch information.

10. Enter a second working mode and hide the contact A and the data related to the contact A.

11. Receive an exit instruction/a screen lock instruction/preset screen lock time arrives.

12. Enter a second screen lock state.

The data on a mobile phone is classified, and data of a specified category is hidden in a second working mode, thereby being capable of ensuring that privacy information of an owner of the mobile phone is not disclosed when a visitor uses the mobile phone normally.

Figure 6:
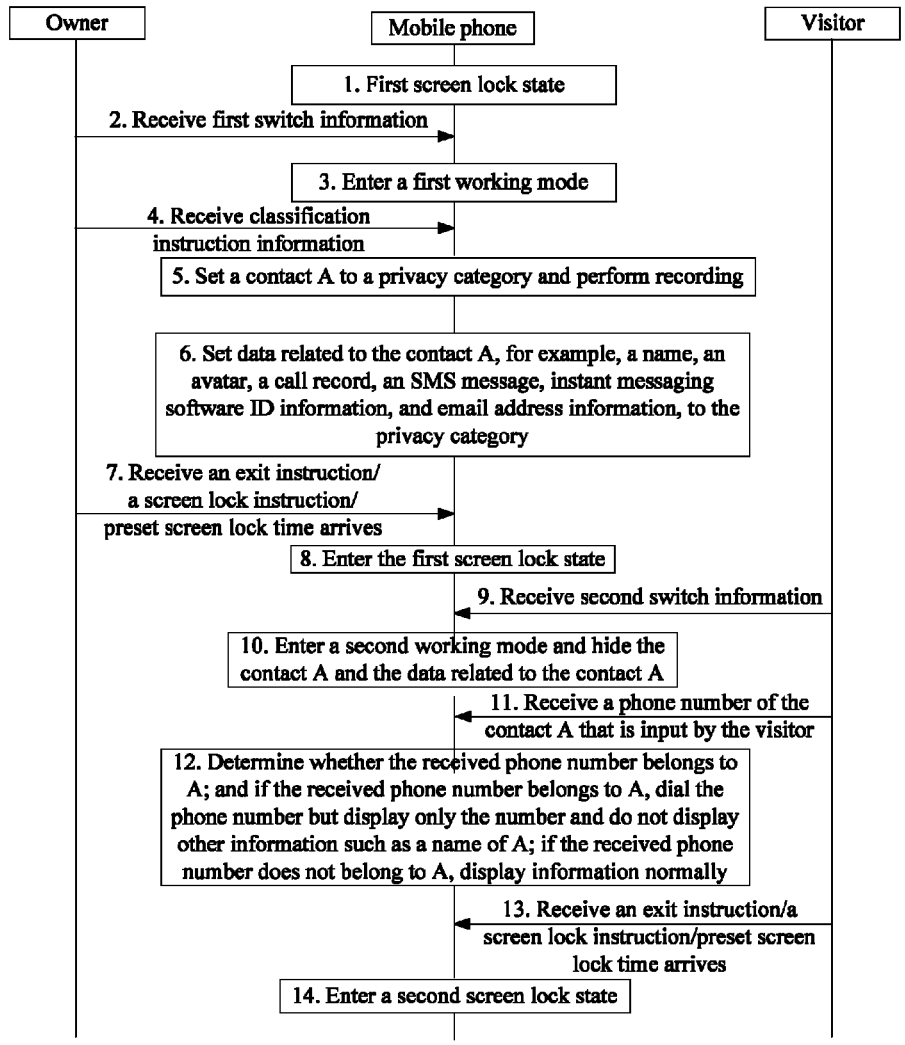
FIG. 6 is a schematic flowchart of hiding contact information on a mobile phone and calling a contact by using a method for processing data and a message according to the present invention.

Referring to FIG. 6, FIG. 6 is a schematic flowchart of hiding contact information on a mobile phone and calling a contact by using a method for processing data and a message according to the present invention. As shown in the figure, a process of the method includes the following steps:

1. A first screen lock state.
2. Receive first switch information.
3. Enter a first working mode.
4. Receive classification instruction information.
5. Set a contact A to a privacy category and perform recording.
6. Set data related to the contact A, for example, a name, an avatar, a call record, an SMS message, instant messaging software ID information, and email address information, to the privacy category.
7. Receive an exit instruction/a screen lock instruction/preset screen lock time arrives.
8. Enter the first screen lock state.
9. Receive second switch information.
10. Enter a second working mode and hide the contact A and the data related to the contact A.
11. Receive a phone number of the contact A that is input by a visitor.
12. Determine whether the received phone number belongs to A; and if the received phone number belongs to A, dial the phone number but display only the number and do not display other information such as a name of A; if the received phone number does not belong to A, display information normally.

The contact A is set to the privacy category in the first working mode and is hidden in the second working mode; therefore, when the visitor dials the phone number of A, the number of A does not match a contact list whose data is partially hidden, and the mobile phone displays only the number of A and performs processing by taking A as an unknown number. When a dialed number is not the number of the contact A, information is displayed normally, where only a number is displayed for an unknown number, and other information, such as a contact number and a name, is displayed for a number not of the privacy category.

13. Receive an exit instruction/a screen lock instruction/preset screen lock time arrives.

14. Enter a second screen lock state.

The contact A is set to the privacy category and hidden. Even if a visitor dials the number of A in the second working mode, other related information, such as a name, of A is not displayed, which protects privacy data of an owner.

Figure 7:
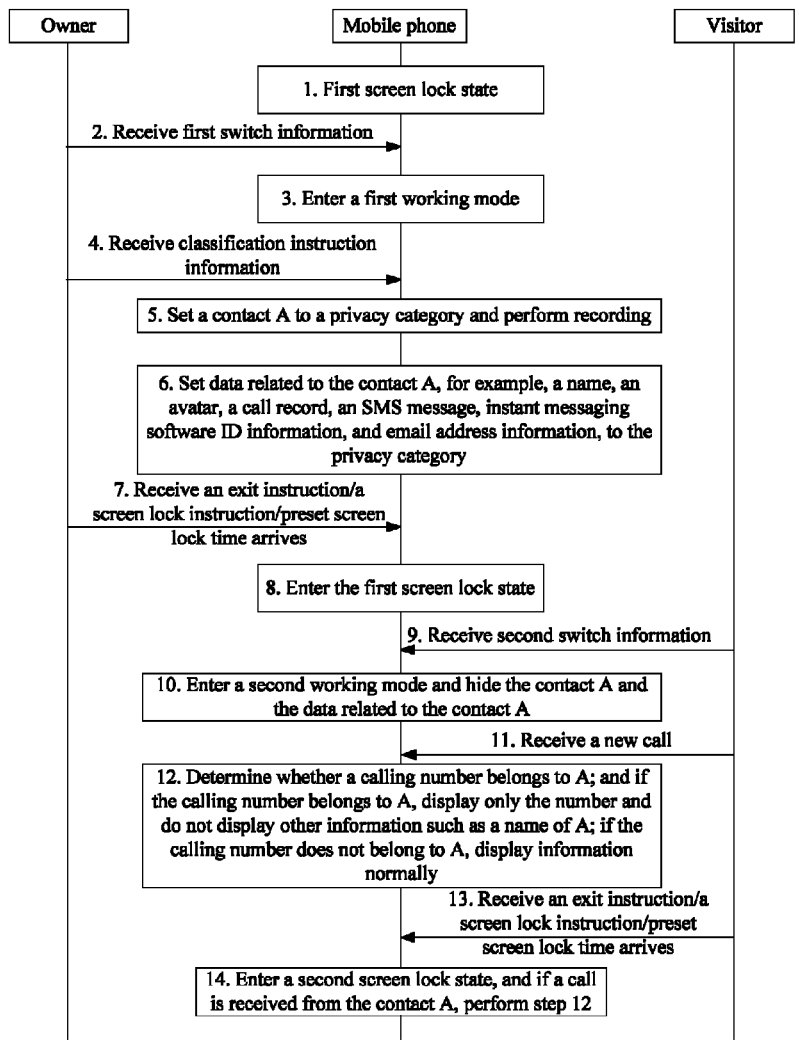
FIG. 7 is a schematic flowchart of hiding contact information on a mobile phone and answering a call of a contact by using a method for processing data and a message according to the present invention.

Referring to FIG. 7, FIG. 7 is a schematic flowchart of hiding contact information on a mobile phone and answering a call of a contact by using a method for processing data and a message according to the present invention. As shown in the figure, a process of the method includes the following steps:

1. A first screen lock state.
2. Receive first switch information.
3. Enter a first working mode.
4. Receive classification instruction information.
5. Set a contact A to a privacy category and perform recording.
6. Set data related to the contact A, for example, a name, an avatar, a call record, an SMS message, instant messaging software ID information, and email address information, to the privacy category.
7. Receive an exit instruction/a screen lock instruction/preset screen lock time arrives.
8. Enter the first screen lock state.
9. Receive second switch information.
10. Enter a second working mode and hide the contact A and the data related to the contact A.
11. Receive a new call.
12. Determine whether a calling number belongs to A; and if the calling number belongs to A, display only the number and do not display other information such as a name of A; if the calling number does not belong to A, display information normally.

The contact A is set to the privacy category in the first working mode and is hidden in the second working mode; therefore, when the call is received from A, a number of A does not match a contact list whose data is partially hidden, and the mobile phone displays only the number of A and performs processing by taking A as an unknown number. When a number of the received call is not the number of the contact A, information is displayed normally, where only a number is displayed for an unknown number, and other information, such as a contact number and a name, is displayed for a number not of the privacy category.

13. Receive an exit instruction/a screen lock instruction/preset screen lock time arrives.

14. Enter a second screen lock state, and if a new call is received, perform step 12.

The contact A is set to the privacy category and hidden. Even if a visitor receives a call from A in the second working mode or the second screen lock state, other related information, such as a name, of A is not displayed, which protects privacy data of an owner.

Figure 8:
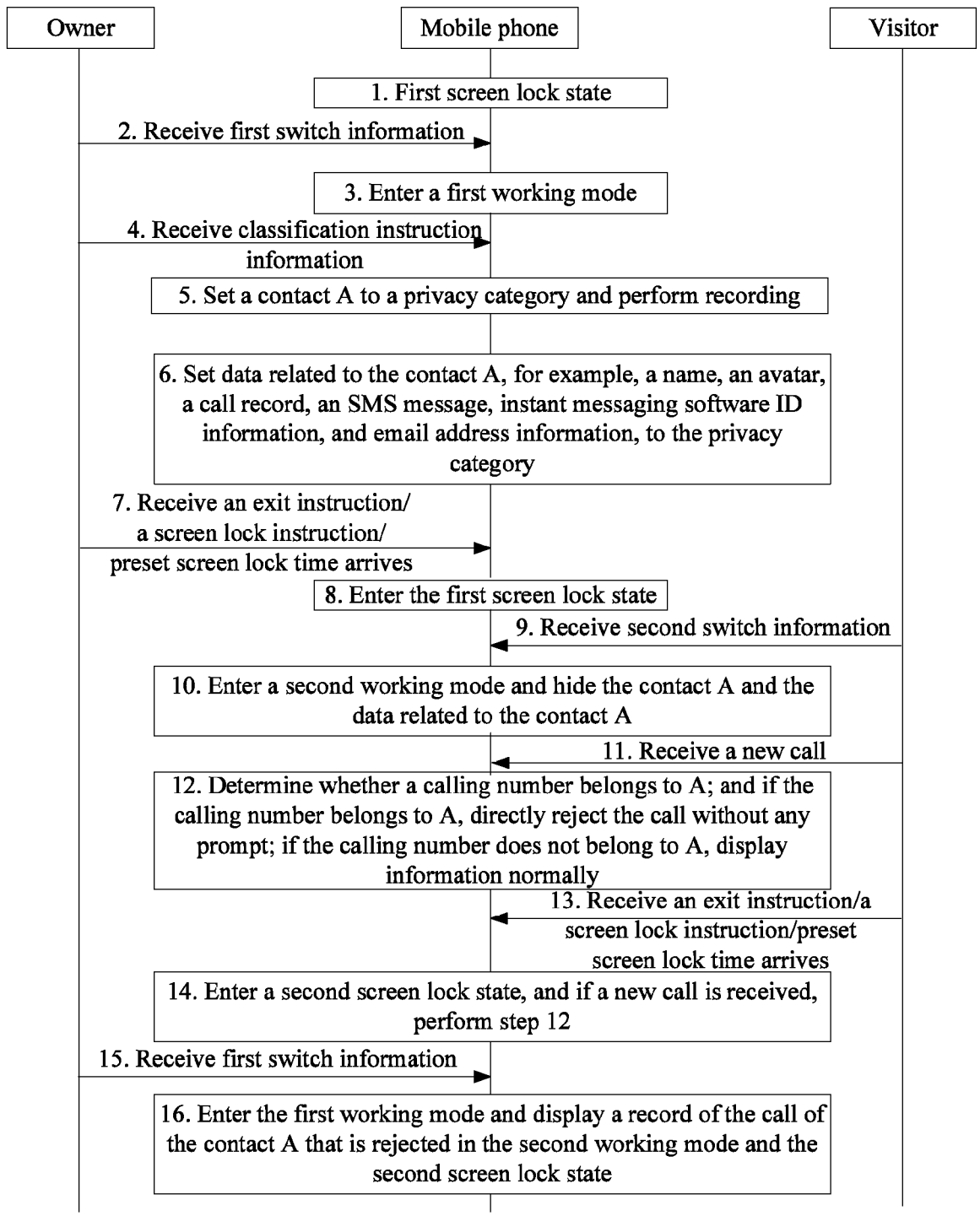
FIG. 8 is another schematic flowchart of hiding contact information on a mobile phone and answering a call of a contact by using a method for processing data and a message according to the present invention.

Referring to FIG. 8, FIG. 8 is another schematic flowchart of hiding contact information on a mobile phone and answering a call of a contact by using a method for processing data and a message according to the present invention. As shown in the figure, a process of the method includes the following steps:

1. A first screen lock state.
2. Receive first switch information.
3. Enter a first working mode.
4. Receive classification instruction information.
5. Set a contact A to a privacy category and perform recording.
6. Set data related to the contact A, for example, a name, an avatar, a call record, an SMS message, instant messaging software ID information, and email address information, to the privacy category.
7. Receive an exit instruction/a screen lock instruction/preset screen lock time arrives.
8. Enter the first screen lock state.
9. Receive second switch information.
10. Enter a second working mode and hide the contact A and the data related to the contact A.
11. Receive a call from the contact A.
12. Determine whether a calling number belongs to A; and if the calling number belongs to A, directly reject the call without any prompt; if the calling number does not belong to A, display information normally.

The contact A is set to the privacy category in the first working mode and is hidden in the second working mode; therefore, when the call is received from A, because a number of A is of the privacy category, the mobile phone may directly reject the call, so as to protect privacy information of an owner. When a number of the received call is not the number of the contact A, information is displayed normally, where only a number is displayed for an unknown number, and other information, such as a contact number and a name, is displayed for a number not of the privacy category.

13. Receive an exit instruction/a screen lock instruction/preset screen lock time arrives.

14. Enter a second screen lock state, and if a new call is received, perform step 12.

15. Receive first switch information.

16. Enter the first working mode and display a record of the call of the contact A that is rejected in the second working mode and the second screen lock state.

The contact A is set to the privacy category and hidden. Even if a visitor receives the call from A in the second working mode or the second screen lock state, the call is directly rejected, which protects privacy data of the owner. In addition, in the first working mode that is used by the owner, the record of the call of the contact A that is rejected in the second working mode and the second screen lock state is displayed, which can prompt, in time, the owner to process a missed call.

Figure 9:
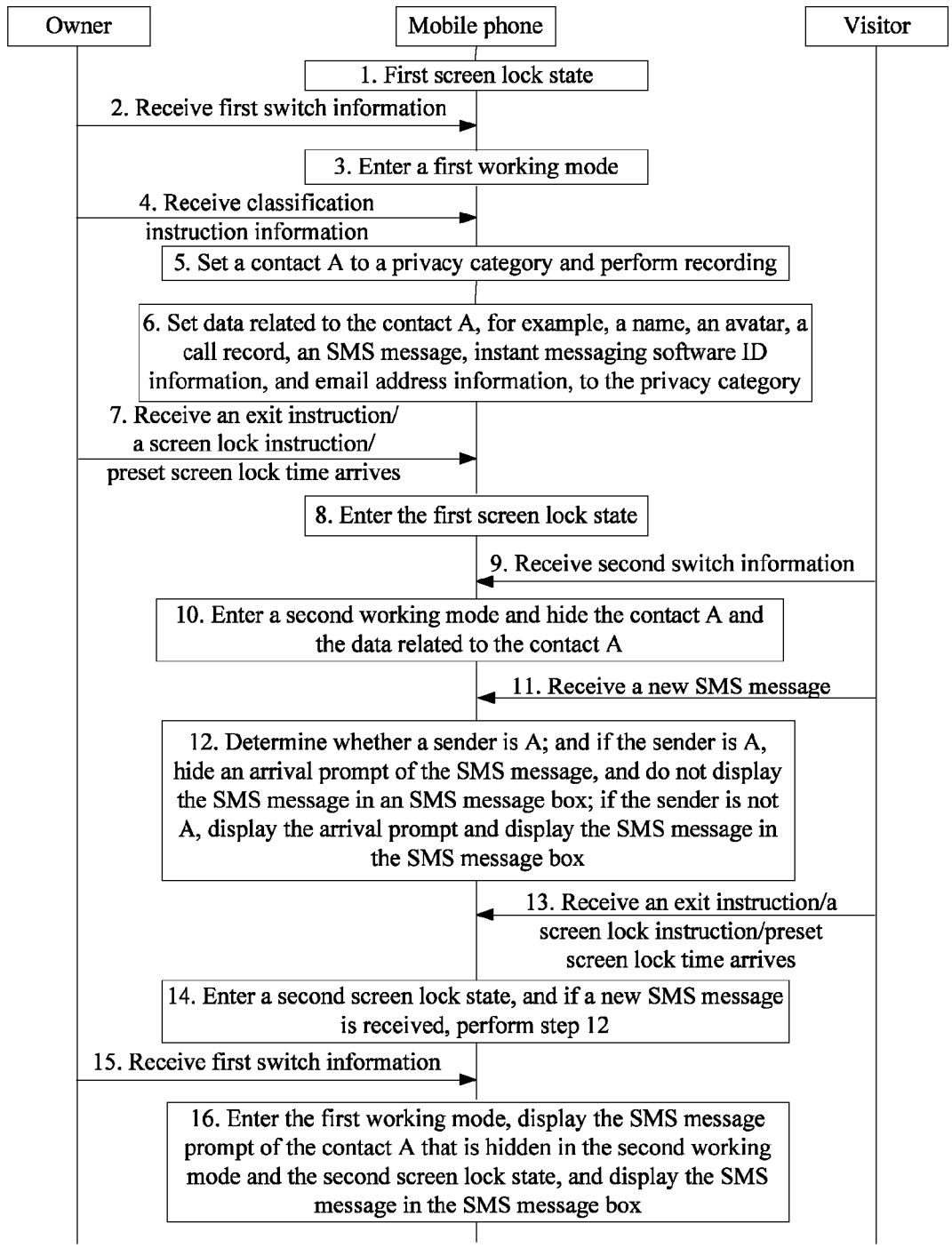
FIG. 9 is a schematic flowchart of hiding contact information on a mobile phone and receiving an SMS message from a contact by using a method for processing data and a message according to the present invention.

Referring to FIG. 9, FIG. 9 is a schematic flowchart of hiding contact information on a mobile phone and receiving an SMS message from a contact by using a method for processing data and a message according to the present invention. As shown in the figure, a process of the method includes the following steps:

1. A first screen lock state.
2. Receive first switch information.
3. Enter a first working mode.
4. Receive classification instruction information.
5. Set a contact A to a privacy category and perform recording.

6. Set data related to the contact A, for example, a name, an avatar, a call record, an SMS message, instant messaging software ID information, and email address information, to the privacy category.

7. Receive an exit instruction/a screen lock instruction/preset screen lock time arrives.

8. Enter the first screen lock state.

9. Receive second switch information.

10. Enter a second working mode and hide the contact A and the data related to the contact A.

11. Receive a new SMS message.

12. Determine whether a sender is A; and if the sender is A, hide an arrival prompt of the SMS message, and do not display the SMS message in an SMS message box; if the sender is not A, display the arrival prompt and display the SMS message in the SMS message box.

The contact A is set to the privacy category in the first working mode, and the data related to the contact A, such as an SMS message, is hidden in the second working mode; therefore, when the SMS message is received from A, because a number of A is of the privacy category, the mobile phone may hide the arrival prompt of the SMS message and does not display the SMS message in the SMS message box, so as to protect privacy information of an owner. When the received SMS message is not sent by the contact A, the arrival prompt is displayed normally, and the SMS message is also displayed in the SMS message box, where only a number and content of the SMS message are displayed for an unknown number, and other information, such as a contact number, a name, and the content of the SMS message, are displayed for a number not of the privacy category.

13. Receive an exit instruction/a screen lock instruction/preset screen lock time arrives.

14. Enter a second screen lock state, and if a new SMS message is received, perform step 12.

15. Receive first switch information.

16. Enter the first working mode, display the SMS message prompt of the contact A that is hidden in the second working mode and the second screen lock state, and display the SMS message in the SMS message box.

The contact A is set to the privacy category and hidden. Even if a visitor receives the SMS message from A in the second working mode or the second screen lock state, no arrival prompt is displayed, and the SMS message is not displayed in the SMS message box either, which protects privacy data of the owner. In addition, in the first working mode that is used by the owner, the SMS message sent by the contact A in the second working mode and the second screen lock state is displayed, which can prompt, in time, the owner to process an unread SMS message.

Figure 10:
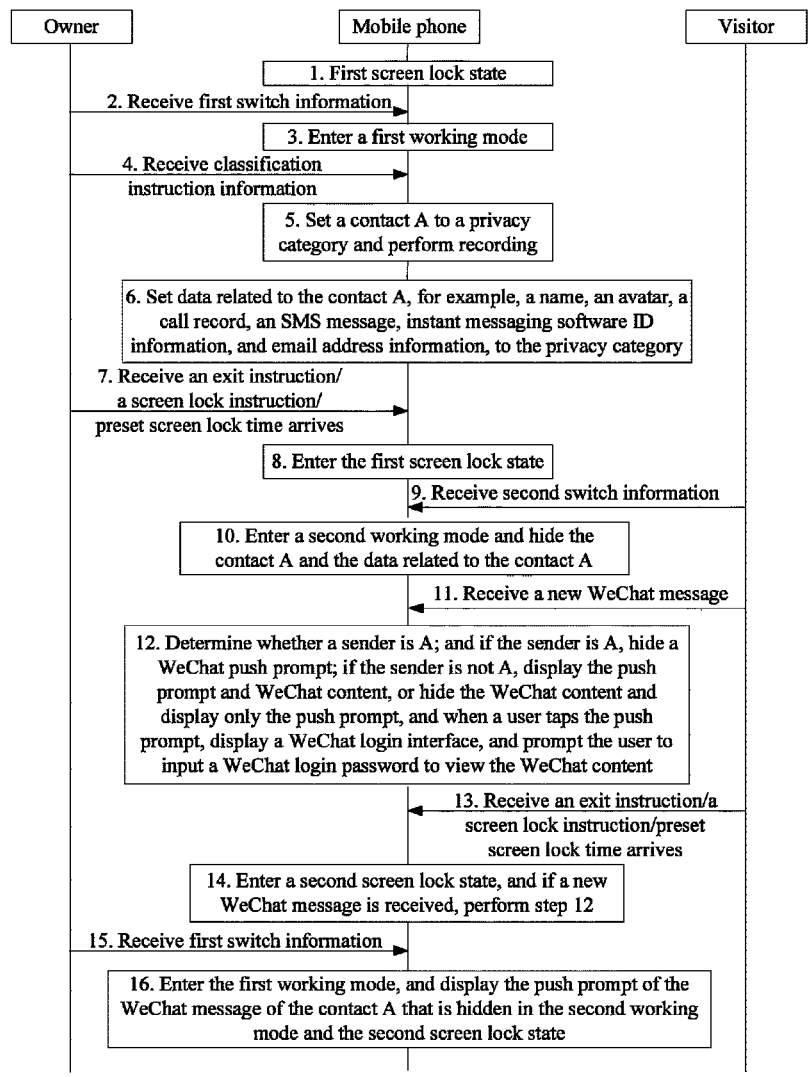
FIG. 10 is a schematic flowchart of hiding contact information on a mobile phone and receiving a WeChat message from a contact by using a method for processing data and a message according to the present invention.

Referring to FIG. 10, FIG. 10 is a schematic flowchart of hiding contact information on a mobile phone and receiving a WeChat message from a contact by using a method for processing data and a message according to the present invention. As shown in the figure, a process of the method includes the following steps:

1. A first screen lock state.
2. Receive first switch information.
3. Enter a first working mode.
4. Receive classification instruction information.
5. Set a contact A to a privacy category and perform recording.
6. Set data related to the contact A, for example, a name, an avatar, a call record, an SMS message, instant messaging software ID information, and email address information, to the privacy category.

7. Receive an exit instruction/a screen lock instruction/preset screen lock time arrives.

8. Enter the first screen lock state.

9. Receive second switch information.

10. Enter a second working mode and hide the contact A and the data related to the contact A.

11. Receive a new WeChat message.

12. Determine whether a sender is A; and if the sender is A, hide a WeChat push prompt; if the sender is not A, display the push prompt and WeChat content, or hide the WeChat content and display only the push prompt, and when a user taps the push prompt, display a WeChat login interface, and prompt the user to input a WeChat login password to view the WeChat content.

Because the contact A is set to the privacy category in the first working mode, the data related to the contact A, such as a WeChat ID, is also of the privacy category. Therefore, when the WeChat message is received from A, because the ID of A is of the privacy category, the mobile phone may hide the WeChat push prompt, so as to protect privacy information of an owner. When the received WeChat message is not sent by the contact A, the push prompt and the WeChat content are displayed normally; or only the push prompt is displayed, and if a visitor taps the push prompt, the WeChat login interface pops up to prompt the user to input the WeChat login password. The visitor does not know the password, and therefore cannot view the WeChat content.

Certainly, in the first working mode, it may also be directly set that a message push prompt of instant messaging software, such as WeChat, is disabled. In this way, no message push prompt of the instant messaging software is received in any working mode or screen lock state. Alternatively, in the first working mode, it may also be set that a message push prompt of instant messaging software, such as WeChat, is disabled only in the second working mode or the second screen lock state. In this way, the message push prompt of the instant messaging software can be received in the first working mode or the first screen lock state, but no message push prompt of the instant messaging software is received in the second working mode or the second screen lock state.

13. Receive an exit instruction/a screen lock instruction/preset screen lock time arrives.

14. Enter a second screen lock state, and if a new WeChat message is received, perform step 13.

15. Receive first switch information.

16. Enter the first working mode, and display the push prompt of the WeChat message of the contact A that is hidden in the second working mode and the second screen lock state.

The contact A is set to the privacy category and hidden. Even if the visitor receives the WeChat message from A in the second working mode or the second screen lock state, no push prompt is displayed, which protects privacy data of the owner. In addition, in the first working mode that is used by the owner, the WeChat message sent by the contact A in the second working mode and the second screen lock state is displayed, which can prompt, in time, the owner to process an unread WeChat message.

Figure 11A:
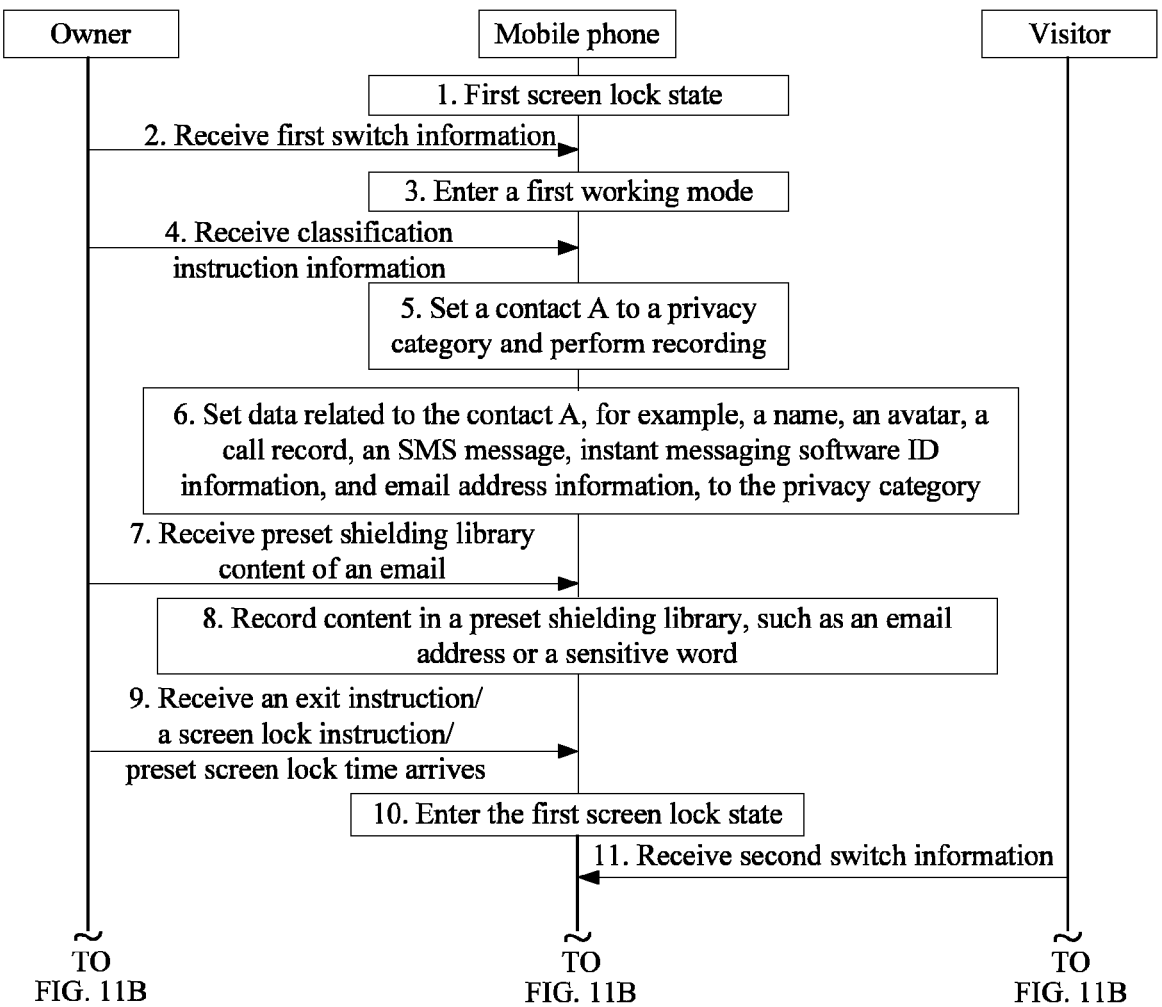
FIG. 11A and FIG. 11B are a schematic flowchart of hiding contact information on a mobile phone and receiving an email from a contact by using a method for processing data and a message according to the present invention.
Figure 11B:
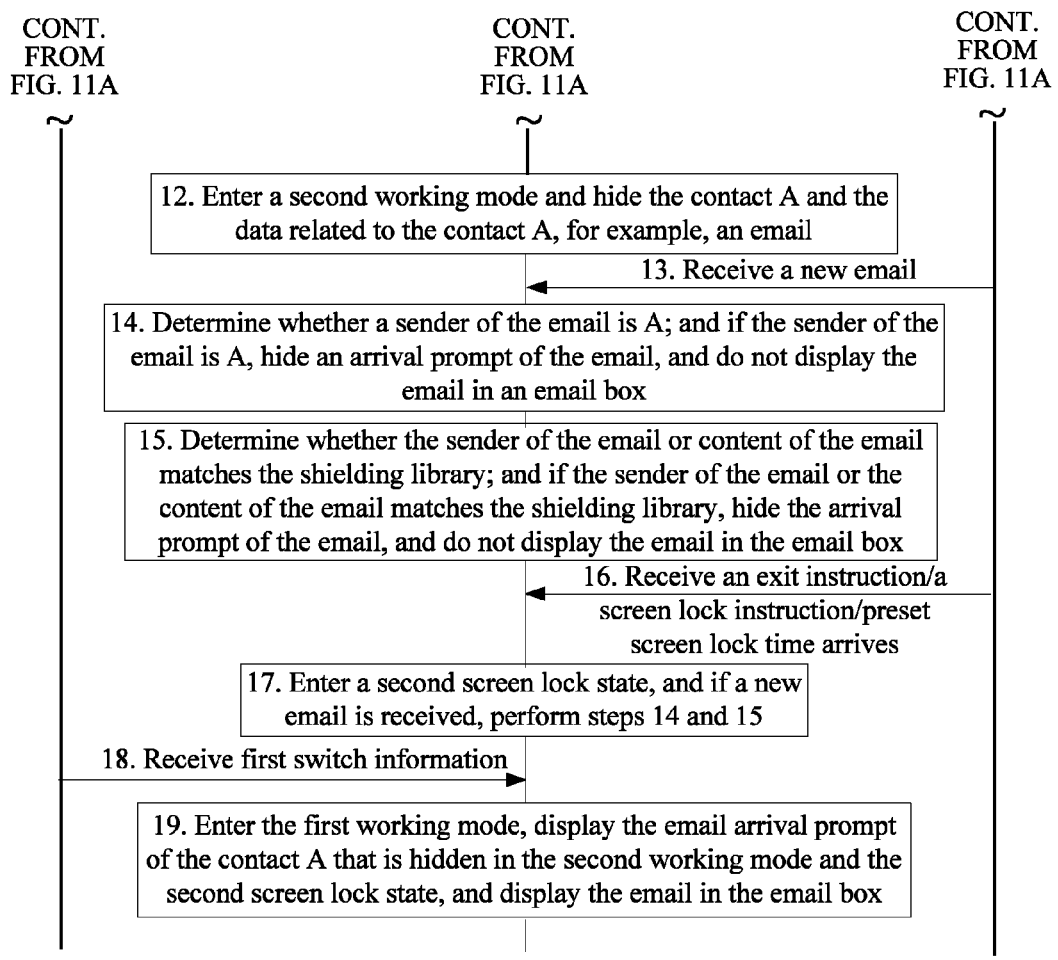

Referring to FIG. 11A and FIG. 11B, FIG. 11A and FIG. 11B are a schematic flowchart of hiding contact information on a mobile phone and receiving an email from a contact by using a method for processing data and a message according to the present invention. As shown in the figure, a process of the method includes the following steps:

1. A first screen lock state.
2. Receive first switch information.

3. Enter a first working mode.
4. Receive classification instruction information.
5. Set a contact A to a privacy category and perform recording.
6. Set data related to the contact A, for example, a name, an avatar, a call record, an SMS message, instant messaging software ID information, and email address information, to the privacy category.
7. Receive preset shielding library data of an email.
The data may be a sender address of the email, such as a confidential email address of a company or an email address of a bank, and may also be a sensitive word in email content, such as transaction or appointment.
8. Record content in the preset shielding library, such as an email address or a sensitive word.
9. Receive an exit instruction/a screen lock instruction/preset screen lock time arrives.
10. Enter the first screen lock state.
11. Receive second switch information.
12. Enter a second working mode and hide the contact A and the data related to the contact A, for example, an email.
13. Receive a new email.
14. Determine whether a sender of the email is A; and if the sender of the email is A, hide an arrival prompt of the email, and do not display the email in an email box.
15. Determine whether the sender of the email or content of the email matches the shielding library; and if the sender of the email or the content of the email matches the shielding library, hide the arrival prompt of the email, and do not display the email in the email box.
16. Receive an exit instruction/a screen lock instruction/preset screen lock time arrives.
17. Enter a second screen lock state, and if a new email is received, perform steps 14 and 15.
18. Receive first switch information.
19. Enter the first working mode, display the email arrival prompt of the contact A that is hidden in the second working mode and the second screen lock state, and display the email in the email box.

The contact A is set to the privacy category and hidden. Even if a visitor receives an email from A in the second working mode or the second screen lock state, no arrival prompt is displayed, and the email is not displayed in the email box either, which protects privacy data of an owner. In addition, by using the preset shielding library, a sensitive email that matches the shielding library can also be hidden, which helps to further protect the privacy data of the owner. In addition, in the first working mode that is used by the owner, the email that is received from the contact A in the second working mode or the second screen lock state and matches the shielding library is displayed, which can prompt, in time, the owner to process an unread email.

Figure 12:
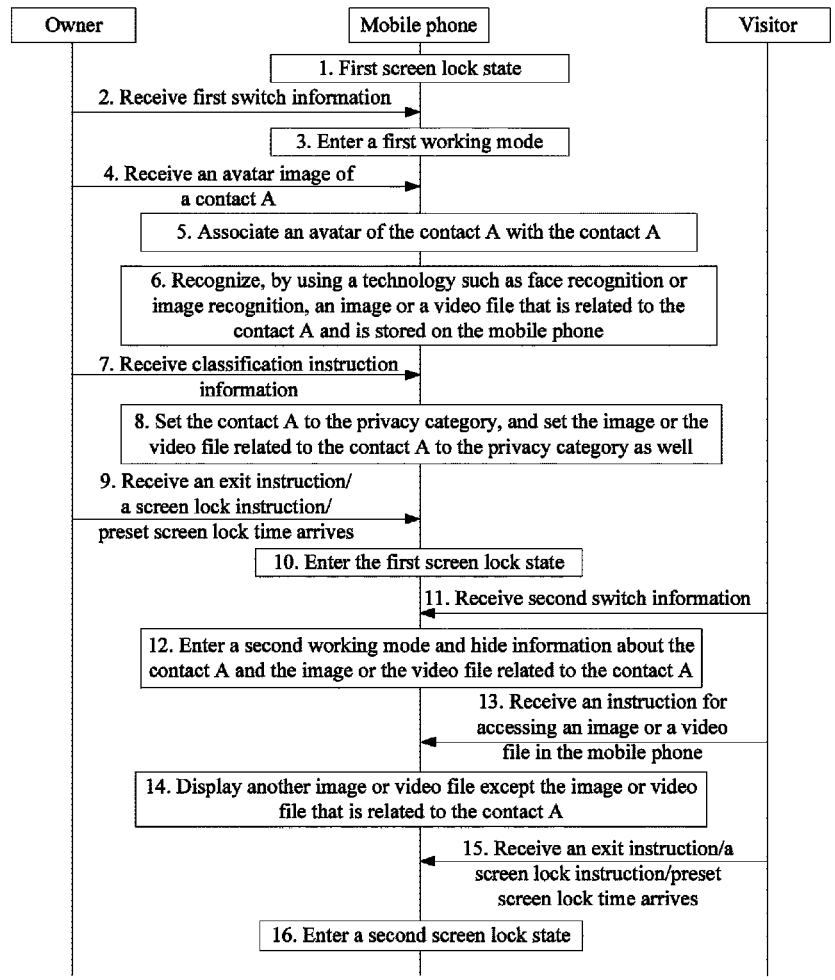
FIG. 12 is a schematic flowchart of hiding contact information and an image or a video related to a contact on a mobile phone by using a method for processing data and a message according to the present invention.

Referring to FIG. 12, FIG. 12 is a schematic flowchart of hiding contact information on a mobile phone and an image or a video related to a contact by using a method for processing data and a message according to the present invention. As shown in the figure, a process of the method includes the following steps:
1. A first screen lock state.
2. Receive first switch information.
3. Enter a first working mode.
4. Receive an avatar image of a contact A.
5. Associate an avatar of the contact A with the contact A.
6. Recognize, by using a technology such as face recognition or image recognition, an image or a video file that is related to the contact A and is stored on the mobile phone.
7. Receive classification instruction information.
8. Set the contact A to a privacy category, and set the image or video file related to the contact A to the privacy category as well.
9. Receive an exit instruction/a screen lock instruction/preset screen lock time arrives.
10. Enter the first screen lock state.
11. Receive second switch information.
12. Enter a second working mode and hide information about the contact A and the image or video file related to the contact A.
13. Receive an instruction for accessing an image or a video file in the mobile phone.
14. Display another image or video file except the image or video file that is related to the contact A.
15. Receive an exit instruction/a screen lock instruction/preset screen lock time arrives.
16. Enter a second screen lock state.

When an image and a video file are hidden, an owner may specify a file, such as an image or a video file, as the privacy category, or a terminal may be used to automatically recognize, by using an image recognition technology such as face recognition, an image or a video file that is related to an avatar of the owner, thereby protecting the image or video that is related to the owner against disclosure.

Figure 13:
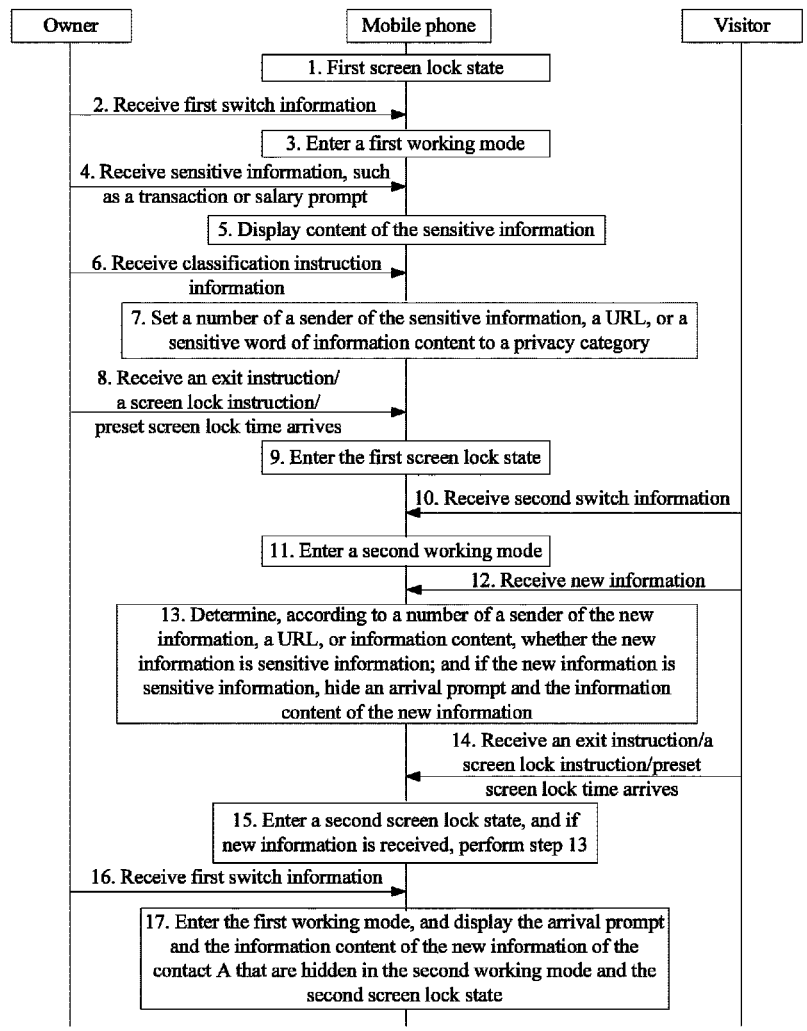
FIG. 13 is a schematic flowchart of hiding sensitive information received by a mobile phone by using a method for processing data and a message according to the present invention.

Referring to FIG. 13, FIG. 13 is a schematic flowchart of hiding sensitive information received by a mobile phone by using a method for processing data and a message according to the present invention. As shown in the figure, a process of the method includes the following steps:
1. A first screen lock state.
2. Receive first switch information.
3. Enter a first working mode.
4. Receive sensitive information, such as a transaction or salary prompt.
5. Display content of the sensitive information.
6. Receive classification instruction information.
7. Set a number of a sender of the sensitive information, a URL, or a sensitive word of information content to a privacy category.
8. Receive an exit instruction/a screen lock instruction/preset screen lock time arrives.
9. Enter the first screen lock state.
10. Receive second switch information.
11. Enter a second working mode.
12. Receive new information.
13. Determine, according to a number of a sender of the new information, a URL, or information content, whether the new information is sensitive information; and if the new information is sensitive information, hide an arrival prompt and the information content of the new information.
14. Receive an exit instruction/a screen lock instruction/preset screen lock time arrives.
15. Enter a second screen lock state, and if new information is received, perform step 13.
16. Receive first switch information.
17. Enter the first working mode, and display the arrival prompt and the information content of the new information that are hidden in the second working mode and the second screen lock state.

Certainly, besides setting some known senders or URLs to the privacy category in the first working mode, a public shielding library may also be set, in advance, to automatically perform shielding, thereby achieving an optimal effect of privacy protection.

Figure 14A:
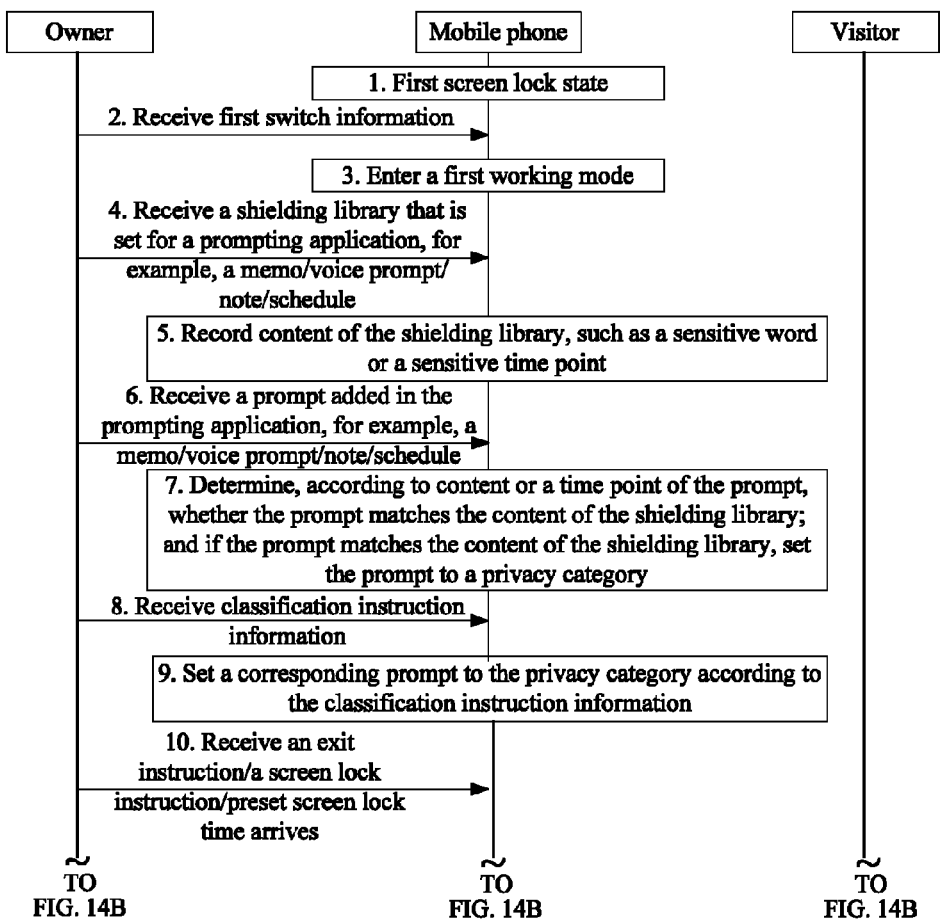
FIG. 14A and FIG. 14B are a schematic flowchart of hiding a prompt of a prompting application on a mobile phone by using a method for processing data and a message according to the present invention.
Figure 14B:
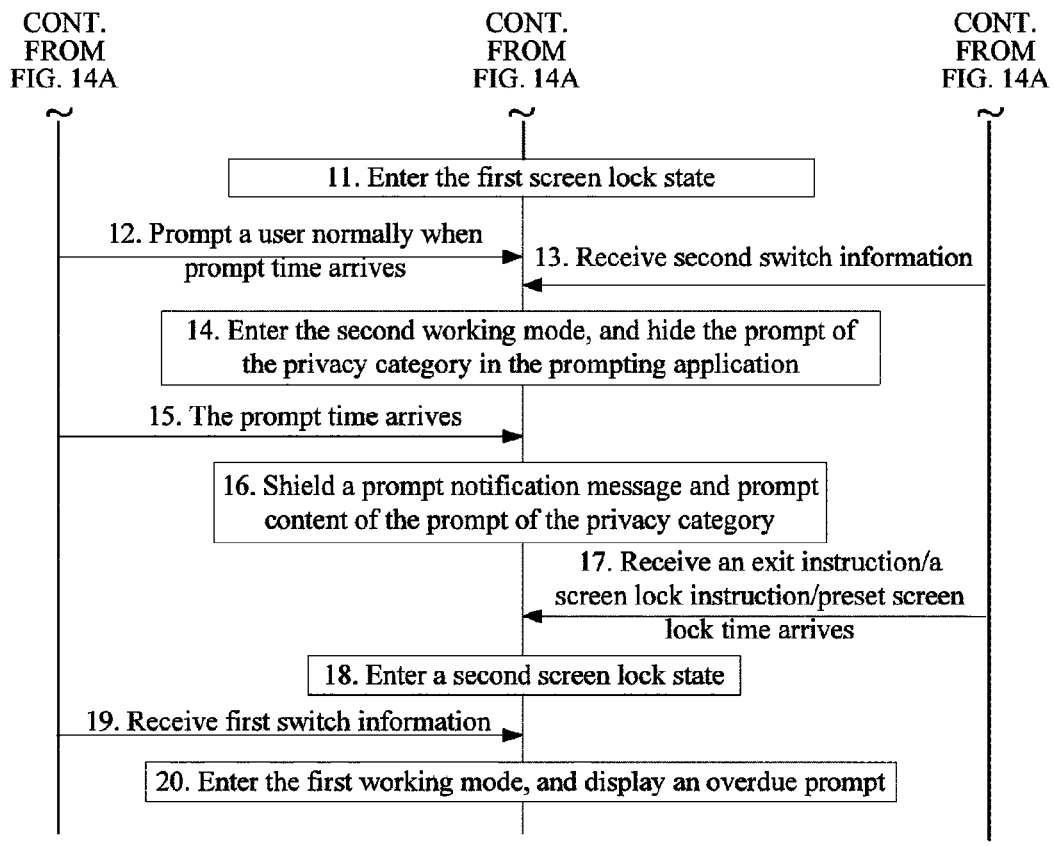

Referring to FIG. 14A and FIG. 14B, FIG. 14A and FIG. 14B are a schematic flowchart of hiding a prompt of a prompting application on a mobile phone by using a method for processing data and a message according to the present invention. As shown in the figure, a process of the method includes the following steps:

1. A first screen lock state.
2. Receive first switch information.
3. Enter a first working mode.
4. Receive a shielding library that is set for a prompting application, for example, a memo/voice prompt/note/schedule.
5. Record content of the shielding library, such as a sensitive word or a sensitive time point.
6. Receive a prompt added in the prompting application, for example, a memo/voice prompt/note/schedule.
7. Determine, according to content or a time point of the prompt, whether the prompt matches the content of the shielding library; and if the prompt matches the content of the shielding library, set the prompt to a privacy category, where the content of the prompt may include but is not limited to a place, a person, an event, and the like.
8. Receive classification instruction information.
9. Set a corresponding prompt to the privacy category according to the classification instruction information.

A priority of a privacy category that is set according to classification instruction information of an owner generally is higher than a priority of a privacy category that the mobile phone automatically matches according to the shielding library. Certainly, the priorities of the two may also be the same, or the priority of the latter may be higher than that of the former.

10. Receive an exit instruction/a screen lock instruction/preset screen lock time arrives.
11. Enter the first screen lock state.
12. (In a case of the first working mode) Prompt a user normally when prompt time arrives.
13. Receive second switch information.
14. Enter the second working mode, and hide the prompt of the privacy category in the prompting application.
15. (In a case of the second working mode) The prompt time arrives.
16. Shield a prompt notification message and prompt content of the prompt of the privacy category.
17. Receive an exit instruction/a screen lock instruction/preset screen lock time arrives.
18. Enter a second screen lock state.
19. Receive first switch information.
20. Enter the first working mode, and display an overdue prompt.

Some prompting software applications may relate to privacy of the owner. For example, some prompts of personal time or prompts of sensitive content may be set to the privacy category by means of specifying by the owner or matching by using a preset shielding library, so that some prompt information and content relating to privacy are not displayed in the second working mode, thereby protecting the privacy of the owner.

Figure 15:
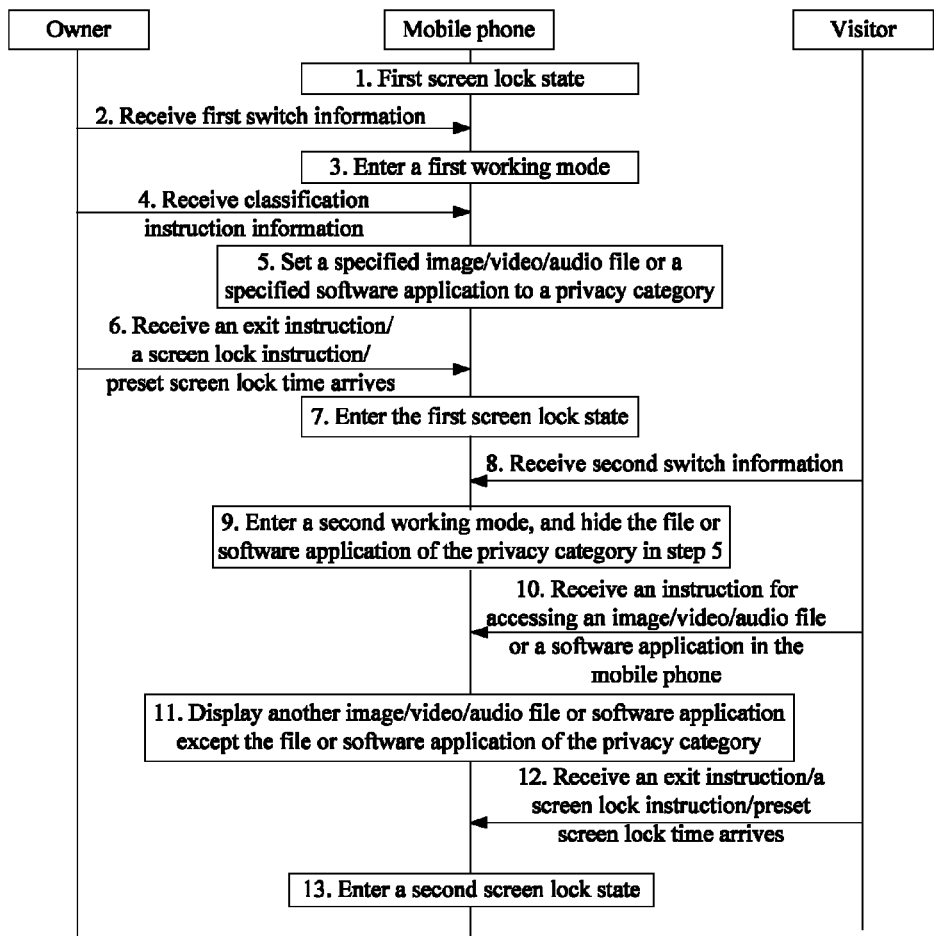
FIG. 15 is a schematic flowchart of hiding a specified file or a specified software application on a mobile phone by using a method for processing data and a message according to the present invention.

Referring to FIG. 15, FIG. 15 is a schematic flowchart of hiding a specified file or a specified software application on a mobile phone by using a method for processing data and a message according to the present invention. As shown in the figure, a process of the method includes the following steps:

1. A first screen lock state.
2. Receive first switch information.
3. Enter a first working mode.
4. Receive classification instruction information.
5. Set a specified file such as an image/video/audio file or a specified software application to a privacy category.
6. Receive an exit instruction/a screen lock instruction/preset screen lock time arrives.
7. Enter the first screen lock state.
8. Receive second switch information.
9. Enter a second working mode, and hide the file or software application of the privacy category in step 5.
10. Receive an instruction for accessing a file such as an image/video/audio file or a software application in the mobile phone.
11. Display another file such as an image/video/audio file or another software application except the file or software application of the privacy category.
12. Receive an exit instruction/a screen lock instruction/preset screen lock time arrives.
13. Enter a second screen lock state.

Some special files such as image or video files, and some special software applications such as a paid application and a software application related to personal information data, may be directly specified as the privacy category by an owner in the first working mode. In this way, when using the mobile phone, a visitor cannot view these files and cannot view the hidden software application either, which protects privacy of the owner.

Figure 16:
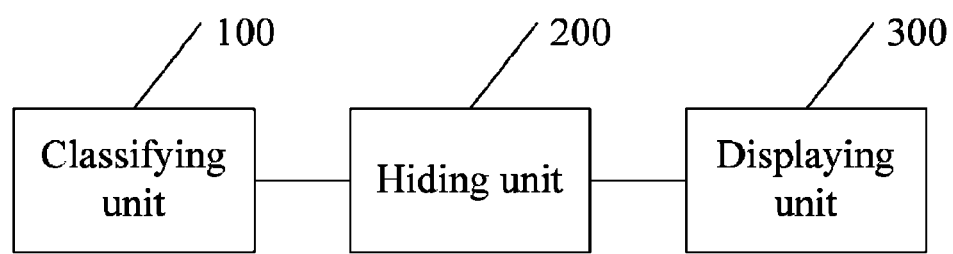
FIG. 16 is a schematic composition diagram of an apparatus for processing data and a message according to the first embodiment of the present invention.

Referring to FIG. 16, FIG. 16 is a schematic composition diagram of an apparatus for processing data and a message according to the first embodiment of the present invention. In this embodiment, the apparatus includes: a classifying unit 100 configured to receive first switch information, enter a first working mode, and classify data stored on the apparatus; a hiding unit 200 configured to receive second switch information, enter a second working mode, and hide, according to classification of the data, data of a specified category and a notification message related to the data of the specified category; and in a second screen lock state or the second working mode, when the notification message related to the data of the specified category is received, hide the notification message; and a displaying unit 300 configured to: in a first screen lock state or the first working mode, when a notification message related to the data is received, display the notification message related to the data; and receive the first switch information, enter the first working mode, and display the data of the specified category and the notification message that are hidden in the second screen lock state or the second working mode.

Specifically, the first switch information may be input in a screen lock state of a terminal, and certainly, may also be input on a normal operation interface of the terminal. A format of the first switch information may be various passwords that are preset by a user, such as a digit, a letter, an image, a sound, a biological characteristic (such as a fingerprint), or a gesture. For example, in the screen lock state, the user may enter the first working mode by inputting an "M"-shaped gesture. Generally, because the terminal is used by the user for most of the time, the first working mode is a normal working mode of the terminal. In this mode, the user has highest setting and access control permission on the data stored on the terminal, and can classify the data stored on the terminal. The data may be contact information, a call record, an SMS message, an email, an image, a video, a software application, and the like, and certainly, may also be other data such as an audio. Using contact information as an example, data, such as information data of a contact A among relatives, included in contact information in a contact list may be set to a privacy category, and information data of a contact B among colleagues may be set to a public category. In this way, information related to the contact A, for example, a contact name and a phone number, and all or a part of data related to the contact A are identified as the privacy category by the terminal. Certainly, the contact information may further include but is not limited to: an office phone number, a mobile phone number, a fax number, an email address, an instant messaging software ID, a microblog ID, a personal home page, a company, a residential address, a postal code, a birthday, an avatar, a vehicle license plate number, a bank account, and the like. In this way, all the related data is identified as the privacy category by the terminal; in addition, a notification message related to the data is also identified as the privacy category. For example, the information of the contact A includes a QQ number of A; accordingly, a message pushed by the QQ number to the terminal is also identified as the privacy category. Specifically, the notification message may be a push message of instant messaging software, or a prompt message of a new call, a new SMS message, or a new email, or may also be a prompt message of a prompting software application such as a memo or a schedule, or the like.

The first screen lock state is a screen lock state that the terminal enters when an instruction for exiting the first working mode or a first screen lock instruction is received, or when first preset screen lock time arrives. In the first screen lock state or the first working mode, when the notification message related to the data is received, the notification message related to the data is displayed. For example, when an SMS message is received from the contact A in the contact information, a notification message is displayed normally; and when a QQ message is received from the contact A in the contact information, a notification message is also displayed normally. In this state, the terminal processes the notification message normally, regardless of whether the notification message is related to data of the privacy category or the public category.

The second switch information may be input in a screen lock state of the terminal, and certainly, may also be input on a normal operation interface of the terminal. A format of the second switch information may be various passwords that are preset by a user, such as a digit, a letter, an image, a sound, a biological characteristic (such as a fingerprint), or a gesture. For example, in the screen lock state, the user may enter the second working mode by inputting an "N"-shaped gesture. Generally, the first switch information is set to be relatively complex to prevent another user from learning the first switch information only by a simple attempt, and the second switch information may be set to be relatively simple, so that the user can easily input the second switch information or tell another user to input the second switch information. The second switch information may be input by the user when the user hands the terminal over to another user, or the another user may be told to input the second switch information, or prompt information may also be provided in the first screen lock state of the terminal to facilitate inputting by the another user. For example, on the first screen lock state interface of the terminal, "Slide left to unlock" is displayed. Accordingly, the user only needs to slide left on a screen of the terminal to enter the second working mode from the first screen lock state. In the second working mode, the terminal hides the data of the specified category that is classified in the first working mode. If the terminal receives, in the second working mode, a notification message related to the data of the privacy category, the terminal also hides the notification message of this type, and displays other notification messages normally. For example, in the first working mode, information of the contact A among relatives is set to the privacy category, and information about the contact B among colleagues is set to the public category.

Accordingly, when entering the second working mode, the terminal hides the information of the contact A to prevent another user from viewing the information of the contact A when using the mobile phone; in addition, in the second working mode, if the terminal receives a notification message related to the information of the contact A, the terminal also hides the notification message. For example, an SMS message or an email related to A is hidden in the second working mode; when a notification message, for example, a message such as a notification indicating a new SMS message from the contact A or a notification indicating a new email, related to the SMS message or email of the contact A is received, the notification message related to the data and the data itself are hidden. However, the data of the public category and a notification message related to the data of the public category do not need to be hidden.

The second screen lock state is a screen lock state that the terminal enters when an instruction for exiting the second working mode or a second screen lock instruction is received, or when second preset screen lock time arrives. In the second screen lock state or the second working mode, another user that is using the mobile phone cannot browse data or a notification message of the privacy category that is specified. In addition, when a notification message, for example, a new call, a new SMS message, a new email, or a new push message of instant messaging software of the contact A, related to the information of the contact A that is specified as the privacy category is received, the notification message is also hidden. Specifically, when the information of the contact A is received, the terminal may compare the received notification message with the data that is set to the privacy category, for example, by using keyword comparison or image recognition, thereby being capable of determining whether the received notification message is related to the data specified as the privacy category. A manner in which the notification message is hidden may be configured differently according to a category of data. For example, regarding an email address that is specified as the privacy category, when a new email is received from the email address, the new email may be directly hidden without any prompt; and regarding a new call of the contact A that is specified as the privacy category, after comparison is performed, only a calling number may be displayed, and a name of the associated contact A is not displayed, which helps a user to view and learn a missed call in time. Certainly, the call may also be directly rejected without any prompt.

When entering the first working mode, the terminal displays all the data of the specified category and the notification message related to the data of the specified category that are hidden in the second mode, so that the user views a new notification message. A specific displaying manner may be prompting the user by using a system message, or prompting the user by using a drop-down notification bar of the terminal, or prompting the user by using a software application related to the data in a manner of a message, a sound, or vibration.

The following describes the method for processing information according to this embodiment in detail by using a call as an example.

The classifying unit 100 first receives first switch information, enters a first working mode, and classifies contact information stored on the apparatus: sets a contact A to a privacy category, and sets a contact B to a public category.

The apparatus enters a first screen lock state when an instruction for exiting the first working mode or a first screen lock instruction is received, or when first preset screen lock time arrives; and in the first screen lock state or the first working mode, when a call or an SMS message is received from the contact A and the contact B, instructs the displaying unit 300 to display a notification message of the call and a notification message of the SMS message, and a user may answer or reject the call freely, and view content of the SMS message freely.

The hiding unit 200 receives second switch information, enters a second working mode, and hides, according to classification of the contact A and the contact B, data of the contact A and a notification message, for example, a call record or an SMS message record, related to the contact A.

The apparatus enters a second screen lock state when an instruction for exiting the second working mode or a second screen lock instruction is received, or when second preset screen lock time arrives; in the second screen lock state or the second working mode, when a call or an SMS message is received from the contact A, directly instructs the hiding unit 200 to hide the call or SMS message received from the contact A, or displays only a number and does not display a name of the contact A; when the phone number of the contact A is dialed, directly rejects the dialing of the phone number of the contact A, or instructs the displaying unit 300 to display only the number and does not display the name of the contact A; and when a call or an SMS message is received from the contact B, directly instructs the displaying unit 300 to display a name and a number of the contact B.

Receive the first switch information, enter the first working mode, and instruct the displaying unit 300 to display a notification message of a new call or a notification message of a new SMS message of the contact A.

Certainly, in addition, an SMS message, an email, and the like may also be processed in the same manner, and details are not repeated herein. Regarding notification information of instant messaging software, when an instant messaging message is received from a contact of the privacy category or when an image or a video included in content of a received message is related to a contact of the privacy category, for example, the apparatus is used to recognize, by using an image recognition technology, that the content is related to data of the privacy category in this case, the content may be directly hidden or the user is prompted to log in to the instant messaging software, and a user except an owner of the apparatus cannot log in because the user does not have a password, and therefore cannot view the message content. An existing image, video, or particular software application, such as AliPay, on the apparatus may be directly set to the privacy category and hidden according to a user requirement.

Two working modes are configured, and different hiding and displaying processing is performed on data and a notification message related to the data in different working modes, thereby being capable of implementing that privacy of a user is protected without affecting proper use of the apparatus by multiple users. When the apparatus enters a first working mode from a second working mode, data and a related notification message that are hidden in the second working mode are displayed in time, so that the user does not miss a newly received notification message, thereby providing convenience for use.

In this embodiment, a manner in which data and a notification message related to the data are processed in two working modes is provided. Certainly, three or more working modes may also be set, different privacy levels are set for data, and data at a different level is hidden in a different working mode, thereby achieving an objective of protecting user privacy under a precondition that a function of an apparatus is implemented.

Preferably, the hiding unit 200 is further configured to: in the second screen lock state or the second working mode, when content of a received notification message matches content of a preset shielding library, hide the notification message.

The preset shielding library is a set of shielded content that is set in advance. The content of the notification message includes at least one of the following: information about a sender of the notification message, and text content, image content, or video content of the notification message.

Hiding data of a specified category and a related notification message may be implemented by specifying a category for the data. For some comparatively sensitive information, a public shielding library may further be preset to compare and hide a received notification message, such as a notification message from a bank, or a notification message from a hospital. For example, 95555 is not stored on an apparatus of a user, that is, the number 95555 cannot be set to a privacy category on the terminal in advance. However, because a message sent by the number 95555 relates to property security of the user, a shielding library may be preset to record the number. When information sent by the number is received, a notification message of the information and content of the information are hidden, or the content of the information is further compared with the preset shielding library, and if the content of the information includes a sensitive word in the shielding library, for example, information such as "salary" or "amount", the notification message of the information and the content of the information are hidden.

The following describes the method for processing information according to this embodiment in detail by using an email as an example.

The classifying unit 100 first receives first switch information, enters a first working mode, and classifies email addresses stored on the apparatus: sets an email address A to a privacy category, and sets an email address B to a public category.

The apparatus enters a first screen lock state when an instruction for exiting the first working mode or a first screen lock instruction is received, or when first preset screen lock time arrives; and in the first screen lock state or the first working mode, when an email is received from the email address A or the email address B, instructs the displaying unit 300 to display a notification message of the email, and a user may view content of the email at any time.

The hiding unit 200 receives second switch information, enters a second working mode, and hides, according to classification of the email address A and the email address B, the email received from the email address A and a notification message related to a contact A.

The apparatus enters a second screen lock state when an instruction for exiting the second working mode or a second screen lock instruction is received, or when second preset screen lock time arrives; and in the second screen lock state or the second working mode, when an email is received from the email address A, directly instructs the hiding unit 200 to hide the email received from the email address A. Certainly, the displaying unit 300 may also be instructed to display only the email address and not display other information, such as a name, related to the email address, and a user cannot view content of the email.

When an email is received from an email address C that does not exist or is not classified on the apparatus, determine whether the email address C and email content received from the email address C match content of a preset shielding library; and if the email address C and the email content match the content of the preset shielding library, instruct the hiding unit 200 to directly hide the email received from the email address A or display only the email address, and the user cannot view the email content.

Receive the first switch information, enter the first working mode, and instruct the displaying unit 300 to display an email notification message of the email address A and the email address C, and the user can view the email content freely.

Certainly, in addition, some particular software applications on the apparatus, for example, prompting software such as a memo, a voice prompt, a note, and a schedule, may also be compared, according to prompt content of the prompting software, with data of a set hidden category. For example, an appointment with Zhang San on Friday in prompted. Because Zhang San is a contact of the hidden category, a notification message of the prompt is hidden in the second working mode. In addition, even if the prompt content is irrelevant to the data of the hidden category, if the prompt content matches a sensitive word, for example, "appointment", in the shielding library, the notification message of the prompt content is identified as the privacy category, and is also hidden in the second working mode.

In this embodiment, a solution for comparing with a preset shielding library and hiding a sensitive notification message is provided, and can further ensure privacy security of a user.

The classifying unit 100 is specifically configured to: receive the first switch information and enter the first working mode; in the first working mode, receive classification instruction information; and classify the data into at least two categories according to the classification instruction information.

During classification, the data may be classified into at least a privacy category and a public category; certainly, the data may also be classified into three or more categories according to an actual requirement. In addition, a displaying and hiding relationship of each category of data in a corresponding working mode is configured. For example, the data is classified into three categories, where a first privacy category has a highest privacy level, a second privacy category has a second highest privacy level, and a third category is a public category; accordingly, three working modes may be set correspondingly, where the first privacy category is displayed only in a first working mode, the second privacy category is displayed in the first working mode and a second working mode, and the public category is displayed in any working mode. Certainly, the number of categories of the data and the number of working modes may be the same or different.

Data on a terminal is classified in detail, so that a most suitable working mode can be released for a user that uses a mobile phone, thereby refining privacy protection.

The first screen lock state is a screen lock state that the terminal enters when an instruction for exiting the first working mode or a first screen lock instruction is received, or when first preset screen lock time arrives, and the second screen lock state is a screen lock state that the terminal enters when an instruction for exiting the second working mode or a second screen lock instruction is received, or when second preset screen lock time arrives.

The data stored on the terminal includes at least one of the following: contact information, a call record, an SMS message, an email, an image, a video, and a software application.

The contact information includes at least a contact name and a phone number.

Certainly, the contact information may further include but is not limited to: an office phone number, a mobile phone number, a fax number, an email address, an instant messaging software ID, a microblog ID, a personal home page, a company, a residential address, a postal code, a birthday, an avatar, a vehicle license plate number, and a bank account.

Figure 17:
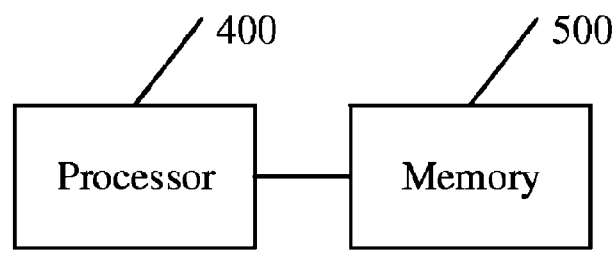
FIG. 17 is a schematic composition diagram of an apparatus for processing data and a message according to the second embodiment of the present invention.

Referring to FIG. 17, FIG. 17 is a schematic composition diagram of an apparatus for processing information according to the second embodiment of the present invention. In this embodiment, the apparatus includes: a processor 400 and a memory 500 that works with the processor 400, where: the memory 500 is configured to store data and a program to be executed by the processor 400; and the processor 400 is configured to: receive first switch information, enter a first working mode, and classify the data stored on the memory; in a first screen lock state or the first working mode, when a notification message related to the data is received, display the notification message related to the data; receive second switch information, enter a second working mode, and hide, according to classification of the data, data of a specified category and a notification message related to the data of the specified category; in a second screen lock state or the second working mode, when the notification message related to the data of the specified category is received, hide the notification message; and receive the first switch information, enter the first working mode, and display the data of the specified category and the notification message that are hidden.

The processor 400 is further configured to: in the second screen lock state or the second working mode, when content of a received notification message matches content of a preset shielding library, hide the notification message, where the preset shielding library is a set of shielded content that is set in advance, and the content of the notification message includes at least one of the following: information about a sender of the notification message, and text content, image content, or video content of the notification message.

The first screen lock state is a screen lock state that the terminal enters when an instruction for exiting the first working mode or a first screen lock instruction is received, or when first preset screen lock time arrives, and the second screen lock state is a screen lock state that the terminal enters when an instruction for exiting the second working mode or a second screen lock instruction is received, or when second preset screen lock time arrives. Data stored on the terminal includes at least one of the following: contact information, a call record, an SMS message, an email, an image, a video, and a software application.

It should be noted that, the embodiments in this specification are described in a progressive manner. Description of each embodiment emphasizes a difference from other embodiments. For same or similar parts in the embodiments, reference may be made to each other. The apparatus embodiments are basically similar to the method embodiments, and therefore are described briefly. For relevant parts, reference may be made to some description of the method embodiments.

According to the description of the foregoing embodiments, the present invention has the following advantages.

Two working modes are configured, and different hiding and displaying processing is performed on data and a notification message related to the data in different working modes, thereby being capable of implementing that privacy of a user is protected without affecting proper use of a terminal by multiple users. When entering a first working mode from a second working mode, the terminal displays data and a related notification message that are hidden in the second working mode in time, so that the user does not miss a related notification message that is newly received, thereby providing convenience for use. Comparison is performed with a preset shielding library, and a sensitive notification message is hidden, which can further ensure privacy security of the user. Data on the terminal is classified in detail, so that a most suitable working mode can be released for a user that uses a mobile phone, thereby refining privacy protection.

A person of ordinary skill in the art may understand that all or a part of the steps of the method embodiments may be implemented by a program instructing relevant hardware. The program may be stored in a computer readable storage medium. When the program runs, the steps of the method embodiments are executed. The foregoing storage medium includes any medium that can store program code, such as a read-only memory (ROM), a random-access memory (RAM), a magnetic disk, or an optical disc.

The foregoing describes the method and the apparatus for processing information that are provided by the embodiments of the present invention in detail. The principle and implementation manners of the present invention are described in this specification by using specific examples. The foregoing embodiments are described to help understand the method and core idea of the present invention. Meanwhile, a person of ordinary skill in the art may change the specific implementation manners and application scope according to the idea of the present invention. Therefore, the specification shall not be construed as a limitation on the present invention.

What is claimed is:

1. A method for processing information, comprising:
    receiving, by a terminal, first switch information;
    entering, by the terminal, a first working mode, wherein the first switch information is a first password, wherein a first application can be run on the terminal in the first working mode and a second working mode, wherein data of the first application comprises a first data and a second data, and wherein the first data can be displayed in the first working mode but is hidden in the second working mode;
    displaying, by the terminal, a first notification message related to the first data in the first working mode when the first notification message related to the first data is received;
    receiving, by the terminal, second switch information;
    entering, by the terminal, a second working mode, wherein the second switch information is a second password, and wherein the first password and the second password are different passwords;
    receiving, a second notification message related to the first data in the second working mode;
    hiding, by the terminal, the second notification message related to the first data in the second working mode;
    receiving, by the terminal, the first switch information;
    entering, by the terminal, the first working mode; and
    displaying, by the terminal, the second notification message that is hidden in the second working mode.

2. Tile method according to claim 1, wherein the content of the first notification message and the second notification message comprise at least one of information about a sender of the notification message, text content, image content, and video content of the notification message.

3. The method according to claim 1, further comprising:
    receiving classification instruction information in the first working mode; and
    classifying the data into at least two categories according to the classification instruction information.

4. The method according to claim 1, wherein the data stored on the terminal comprises at least one contact information, a call record, a short message service (SMS) message, an electronic mail (email), an image, a video, and a software application.

5. The method according to claim 4, wherein the contact information comprises at least a contact name and a phone number associated with the contact.

6. The apparatus according to claim 5, wherein the processor is further configured to:
    receive classification instruction information when the terminal is in the first working mode; and
    classify the data into at least two categories according to the classification instruction information.

7. The apparatus according to claim 5, wherein the first notification message is at least one of a pop up notification, prompt notification, and push notification related to private data and public data, and wherein the second notification message is at least one of the pop up notification, the prompt notification, and the push notification.

8. The method according to claim 1, wherein the first notification messages is at least one of a pop up notification, prompt notification, and push notification related to private data and public data, and wherein the second notification message is at least one of the pop up notification, the prompt notification, and the push notification.

9. An apparatus for processing information, comprising:
    a processor;
    a memory coupled to the processor; and
    a display coupled to the processor;
    wherein the memory is configured to store data and a program to be executed by the processor, and
    wherein the processor is configured to:
        receive first switch information; and
        enter a first working mode, wherein the first switch information is a first password, wherein a first application can be run on the terminal in the first working mode and a second working mode, wherein data of the first application comprises a first data and a second data, and wherein the first data can be displayed in the first working mode but is hidden in the second working mode,
    wherein the display is configured to display a first notification message related to the first data in the first working mode when the first notification message related to the first data is received;
    wherein the processor is further configured to:
        receive second switch information;
        enter a second working mode, wherein the second switch information is a second password, and wherein the first password and the second password are different passwords;
        receive a second notification message related to the first data in the second working mode;
        hide the second notification message related to the first data in the second working mode;
        receive the first switch information; and
        enter the first working mode, and wherein the display is further configured to display the data of the specified category and the notification message that are hidden.

10. The apparatus according to claim 9, wherein the apparatus comprises at least one of a mobile phone, a computer, and a communication tablet.

11. The apparatus according to claim 9, wherein the content of the first notification message and the second notification message comprise at least one of information about a sender of the notification message, text content, image content, and video content of the notification message.

12. The apparatus according to claim 9, wherein data stored on the apparatus comprises at least one of contact information, a call record, a short message service (SMS) message, an electronic mail (email), an image, a video, and a software application.

13. The apparatus according to claim 12, wherein the contact information comprises at least a contact name and a phone number associated with the contact.

14. A non-transitory computer-readable medium comprising instructions, which, when executed by a computer, cause the computer to perform a method, wherein the method comprises:
   receiving, by a terminal, first switch information;
   entering, by the terminal, a first working mode, wherein the first switch information is a first password, wherein a first application can be run on the terminal in the first working mode and second working mode, wherein data of the first application comprises a first data and a second data, and wherein the first data can be displayed in the first working mode but is hidden in the second working mode;
   displaying, by the terminal, a first notification message related to the first data in the first working mode when the first notification message related to the data is received;
   receiving, by the terminal, second switch information;
   entering, by the terminal a second working mode, wherein the second switch information is a second password, and wherein the first password and the second password are different passwords;
   receiving by the terminal, a second notification message related to the first data in the second working mode;
   hiding, by the terminal, the second notification message related to the first date in the second working mode;
   receiving, by the terminal, the first switch information entering the first working mode; and
   displaying the second notification message that is hidden in the second working mode.

15. The non-transitory computer-readable medium according to claim 14, wherein the content of the notification message comprises at least one of information about a sender of the notification message, text content, image content, and video content of the notification message.

16. The non-transitory computer-readable medium according to claim 14, wherein the data stored on the terminal comprises at least one of the following: contact information associated with a contact, a call record, a short message service (SMS) message, an electronic mail (email), an image, a video, and a software application.

17. The non-transitory computer-readable medium according to claim 16, wherein the contact information comprises at least a contact name and a phone number associated with the contact.

18. The non-transitory computer-readable medium according to claim 14, wherein the first notification messages is at least one of a pop up notification, prompt notification, and push notification related to private data and public data, and wherein the second notification message is at least one of the pop up notification, the prompt notification, and the push notification.

* * * * *